(12) United States Patent
Borchardt et al.

(10) Patent No.: US 10,293,981 B2
(45) Date of Patent: May 21, 2019

(54) NON-CONTINUOUSLY LAMINATED STRUCTURES OF THERMOPLASTIC FILMS WITH DIFFERING MATERIAL COMPOSITIONS AND FUNCTIONAL MATERIAL PROPERTIES

(71) Applicant: The Glad Products Company, Oakland, CA (US)

(72) Inventors: Michael G. Borchardt, Willowbrook, IL (US); Jason R. Maxwell, Willowbrook, IL (US); Ranyi Zhu, Willowbrook, IL (US); Shaun T. Broering, Fort Thomas, KY (US); Deborah Fix, Maineville, OH (US)

(73) Assignee: The Glad Products Company, Oakland, CA (US)

( * ) Notice: Subject to any disclaimer, the term of this patent is extended or adjusted under 35 U.S.C. 154(b) by 0 days.

(21) Appl. No.: 15/967,238

(22) Filed: Apr. 30, 2018

(65) Prior Publication Data
US 2018/0244433 A1    Aug. 30, 2018

Related U.S. Application Data

(63) Continuation-in-part of application No. 14/547,049, filed on Nov. 18, 2014, which is a continuation of
(Continued)

(51) Int. Cl.
*B65D 30/08*    (2006.01)
*B32B 3/28*    (2006.01)
(Continued)

(52) U.S. Cl.
CPC .............. *B65D 31/04* (2013.01); *B29C 65/56* (2013.01); *B29C 66/1122* (2013.01);
(Continued)

(58) Field of Classification Search
CPC ........... B65D 31/04; B32B 3/28; B32B 27/32; B32B 27/08; B32B 27/30; B32B 27/16;
(Continued)

(56) References Cited

U.S. PATENT DOCUMENTS 2,714,571 A    8/1955    Irion et al.
3,008,862 A    11/1961    Haine et al.
(Continued)

FOREIGN PATENT DOCUMENTS

| KR | 10-1032232 B1 | 5/2011 |
| WO | WO199013702 | 11/1990 |
| WO | WO1999056953 | 11/1999 |

OTHER PUBLICATIONS

International Search Report, dated Sep. 4, 2013, from counterpart PCT/US2013/050541, filed Jul. 15, 2013.

*Primary Examiner* — Michael C Miggins
(74) *Attorney, Agent, or Firm* — Thomas C. Feix

(57) ABSTRACT

A non-continuously laminated structure of thermoplastic films comprises thermoplastic films with differing material compositions and differing functional benefits. In particular, one or more embodiments comprise thermoplastic films that are co-extruded separately and then combined together by a post-extrusion bonding process. The differing composition of the various films of the non-continuously laminated structure of thermoplastic films and the post-extrusion bonding process, provide the structures with the functional benefits of the individual films.

20 Claims, 22 Drawing Sheets

Related U.S. Application Data application No. 13/299,512, filed on Nov. 18, 2011, now Pat. No. 8,940,377, which is a continuation-in-part of application No. 12/947,025, filed on Nov. 16, 2010, now Pat. No. 8,603,609.

(60) Provisional application No. 61/261,673, filed on Nov. 16, 2009.

(51) Int. Cl.

| | | |
|---|---|---|
| *B32B 27/32* | (2006.01) | |
| *B32B 27/08* | (2006.01) | |
| *B30B 11/18* | (2006.01) | |
| *B31F 1/07* | (2006.01) | |
| *B32B 38/06* | (2006.01) | |
| *B32B 37/00* | (2006.01) | |
| *B32B 7/14* | (2006.01) | |
| *B29C 65/00* | (2006.01) | |
| *B29C 65/56* | (2006.01) | |
| *B31B 70/00* | (2017.01) | |
| *B32B 27/30* | (2006.01) | |
| *B32B 27/16* | (2006.01) | |
| *B32B 7/12* | (2006.01) | |
| *B32B 7/05* | (2019.01) | |
| *B31F 1/20* | (2006.01) | |
| *B31B 70/10* | (2017.01) | |
| *B31B 70/88* | (2017.01) | |
| *B31B 70/64* | (2017.01) | |
| *B31B 70/86* | (2017.01) | |
| *B32B 38/00* | (2006.01) | |
| *B29C 65/08* | (2006.01) | |
| *B29L 31/00* | (2006.01) | |
| *B29C 65/02* | (2006.01) | |
| *B29C 65/74* | (2006.01) | |
| *B29C 65/18* | (2006.01) | |
| *B29K 9/06* | (2006.01) | |
| *B29K 23/00* | (2006.01) | |
| *B29K 33/00* | (2006.01) | |
| *B29K 75/00* | (2006.01) | |
| *B31B 155/00* | (2017.01) | |
| *B31B 160/10* | (2017.01) | |
| *B31B 170/20* | (2017.01) | |
| *B29C 65/48* | (2006.01) | |
| *B31B 170/30* | (2017.01) | |

(52) U.S. Cl.
CPC .......... *B29C 66/232* (2013.01); *B29C 66/234* (2013.01); *B29C 66/3452* (2013.01); *B29C 66/43* (2013.01); *B29C 66/431* (2013.01); *B29C 66/438* (2013.01); *B29C 66/73921* (2013.01); *B29C 66/81433* (2013.01); *B29C 66/81435* (2013.01); *B29C 66/83413* (2013.01); *B29C 66/8511* (2013.01); *B30B 11/18* (2013.01); *B31B 70/008* (2017.08); *B31B 70/10* (2017.08); *B31B 70/645* (2017.08); *B31B 70/872* (2017.08); *B31B 70/874* (2017.08); *B31B 70/88* (2017.08); *B31F 1/07* (2013.01); *B31F 1/20* (2013.01); *B32B 3/28* (2013.01); *B32B 7/05* (2019.01); *B32B 7/12* (2013.01); *B32B 7/14* (2013.01); *B32B 27/08* (2013.01); *B32B 27/16* (2013.01); *B32B 27/30* (2013.01); *B32B 27/32* (2013.01); *B32B 37/0076* (2013.01); *B32B 38/06* (2013.01); *B29C 65/02* (2013.01); *B29C 65/08* (2013.01); *B29C 65/18* (2013.01); *B29C 65/48* (2013.01); *B29C 65/4815* (2013.01); *B29C 65/743* (2013.01); *B29C 66/028* (2013.01); *B29C 66/436* (2013.01); *B29C 66/45* (2013.01); *B29C 66/71* (2013.01); *B29C 66/723* (2013.01); *B29K 2009/06* (2013.01); *B29K 2023/00* (2013.01); *B29K 2023/06* (2013.01); *B29K 2023/065* (2013.01); *B29K 2023/0616* (2013.01); *B29K 2023/0625* (2013.01); *B29K 2023/0633* (2013.01); *B29K 2033/08* (2013.01); *B29K 2033/12* (2013.01); *B29K 2075/00* (2013.01); *B29L 2031/7129* (2013.01); *B31B 2155/00* (2017.08); *B31B 2155/0014* (2017.08); *B31B 2160/10* (2017.08); *B31B 2170/20* (2017.08); *B31B 2170/30* (2017.08); *B31F 2201/0733* (2013.01); *B31F 2201/0735* (2013.01); *B31F 2201/0738* (2013.01); *B31F 2201/0743* (2013.01); *B31F 2201/0748* (2013.01); *B31F 2201/0764* (2013.01); *B32B 2038/0028* (2013.01); *B32B 2250/24* (2013.01); *B32B 2307/51* (2013.01); *B32B 2307/54* (2013.01); *B32B 2307/558* (2013.01); *B32B 2307/5825* (2013.01); *B32B 2307/7163* (2013.01); *B32B 2398/20* (2013.01); *B32B 2439/06* (2013.01); *Y10T 428/1334* (2015.01); *Y10T 428/1352* (2015.01); *Y10T 428/2405* (2015.01); *Y10T 428/24041* (2015.01); *Y10T 428/24562* (2015.01)

(58) Field of Classification Search
CPC ... B32B 7/12; B32B 2398/20; B32B 2439/06; B32B 2439/2038; B32B 2439/0028; B32B 2307/7163; B32B 2307/5825; B32B 2307/558; B32B 2307/54; B32B 2307/51; B32B 38/06; B32B 37/0076; B32B 7/14; B32B 7/045; B32B 2250/24; B30B 11/18; B31F 1/07; B31F 2201/0764; B31F 2201/0748; B31F 2201/0743; B31F 2201/0738; B31F 2201/0735; B31F 2201/0733; B29C 66/8511; B29C 66/83413; B29C 66/81435; B29C 66/73921; B29C 66/438; B29C 66/431; B29C 66/43; B29C 66/3452; B29C 66/234; B29C 66/232; B29C 66/1122; B29C 66/56; B29C 66/81433; B29C 66/028; B29C 65/08; B29C 65/65; B29C 65/02; B29C 66/45; B29C 65/743; B29C 65/18; B29C 66/723; B29C 66/71; B29C 66/436; B29C 65/4815; B29C 65/48; B29L 2031/7129; B29K 2009/06; B29K 2023/00; B29K 2023/06; B29K 2023/0616; B29K 2023/0625; B29K 2023/0633; B29K 2023/065; B29K 2023/08; B29K 2033/12; B29K 2075/00; Y10T 428/24562; Y10T 428/24041; Y10T 428/1352; Y10T 428/1334; Y10T 428/2405; B31B 2155/0014; B31B 70/008; B31B 2155/00; B31B 2160/10; B31B 2170/20
See application file for complete search history.

(56) References Cited

U.S. PATENT DOCUMENTS

| | | |
|---|---|---|
| 3,058,868 A | 10/1962 | Schroeder |
| 3,130,647 A | 4/1964 | Anderson et al. |
| 3,318,759 A | 5/1967 | Anderson |

(56) References Cited

U.S. PATENT DOCUMENTS

| | | | |
|---|---|---|---|
| 3,622,422 A | 11/1971 | Newman et al. |
| 3,746,607 A | 7/1973 | Harmon et al. |
| 3,857,144 A | 12/1974 | Bustin |
| 3,973,063 A | 8/1976 | Clayton |
| 4,116,892 A | 9/1978 | Schwarz |
| 4,153,664 A | 5/1979 | Sabee |
| 4,153,751 A | 5/1979 | Schwarz |
| 4,289,832 A | 9/1981 | Schwarz |
| 4,302,495 A | 11/1981 | Marra |
| 4,343,848 A | 8/1982 | Leonard, Jr. |
| 4,379,197 A | 4/1983 | Cipriani |
| 4,438,167 A | 3/1984 | Schwarz |
| 4,517,714 A | 5/1985 | Sneed et al. |
| 4,522,203 A | 6/1985 | Mays |
| 4,614,679 A | 9/1986 | Farrington, Jr. et al. |
| 4,692,368 A | 9/1987 | Taylor et al. |
| 4,704,238 A | 11/1987 | Okuyama et al. |
| 4,753,840 A | 6/1988 | Van Gompel |
| 4,793,885 A | 12/1988 | Rasmussen |
| 4,930,905 A | 6/1990 | Sharps, Jr. |
| 5,035,941 A | 7/1991 | Blackburn |
| 5,100,721 A | 3/1992 | Akao |
| 5,205,650 A | 4/1993 | Rasmussen |
| 5,296,184 A | 3/1994 | Wu et al. |
| 5,382,461 A | 1/1995 | Wu |
| 5,422,172 A | 6/1995 | Wu |
| 5,518,801 A | 5/1996 | Chappell et al. |
| 5,851,937 A | 12/1998 | Wu et al. |
| 5,861,074 A | 1/1999 | Wu |
| 5,865,824 A | 2/1999 | Chen et al. |
| 5,865,926 A | 2/1999 | Wu et al. |
| 5,882,769 A | 3/1999 | McCormack |
| 6,013,151 A | 1/2000 | Wu et al. |
| 6,214,147 B1 | 4/2001 | Mortellite et al. |
| 6,254,736 B1 | 7/2001 | Earl et al. |
| 6,265,045 B1 | 7/2001 | Mushaben |
| 6,361,784 B1 | 3/2002 | Brennan et al. |
| 6,385,818 B1 | 5/2002 | Savicki, Sr. |
| 6,579,008 B2 | 6/2003 | Price et al. |
| 7,132,151 B2 | 11/2006 | Rasmussen |
| 7,270,861 B2 | 9/2007 | Broering et al. |
| 7,306,729 B2 | 12/2007 | Bacino et al. |
| 7,901,758 B2 | 3/2011 | Rasmussen |
| 8,263,210 B2 | 9/2012 | Ramussen |
| 8,309,206 B2 | 11/2012 | Rasmussen |
| 8,557,364 B2 | 10/2013 | Rasmussen |
| 2001/0043673 A1 | 11/2001 | Gershon |
| 2002/0074691 A1 | 6/2002 | Mortellite et al. |
| 2004/0247806 A1 | 12/2004 | Schmal |
| 2005/0123726 A1 | 6/2005 | Broering |
| 2006/0083900 A1 | 4/2006 | Ashraf |
| 2006/0093766 A1 | 5/2006 | Savicki et al. |
| 2007/0166503 A1 | 7/2007 | Hannigan |
| 2007/0254120 A1 | 11/2007 | Rasmussen |
| 2007/0257402 A1 | 11/2007 | Rasmussen |
| 2008/0124461 A1 | 5/2008 | Leener et al. |
| 2009/0029114 A1 | 1/2009 | Cancio et al. |
| 2009/0068427 A1 | 3/2009 | Patel |
| 2009/0230132 A1 | 9/2009 | Takedutsumi et al. |
| 2011/0117307 A1 | 5/2011 | Fraser et al. |
| 2012/0064271 A1 | 3/2012 | Broering et al. |

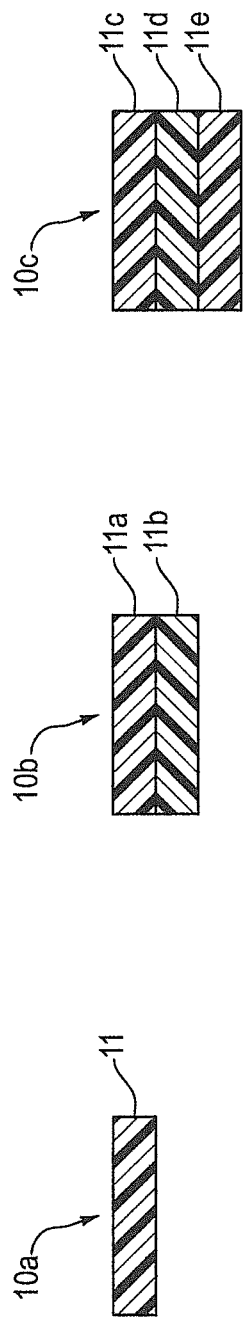
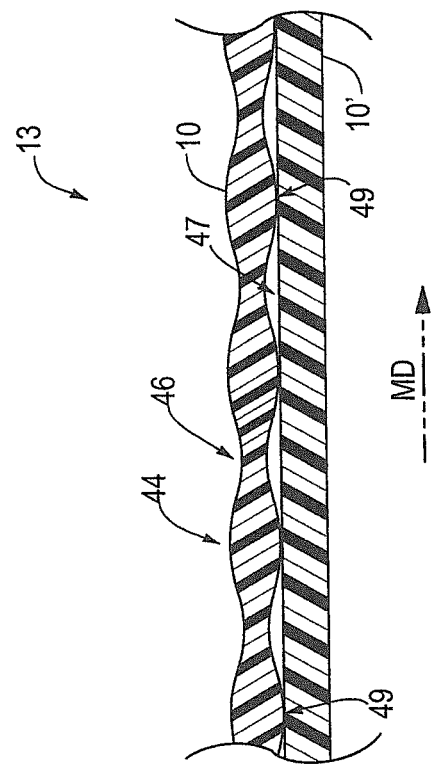

NON-CONTINUOUSLY LAMINATED STRUCTURES OF THERMOPLASTIC FILMS WITH DIFFERING MATERIAL COMPOSITIONS AND FUNCTIONAL MATERIAL PROPERTIES

CROSS-REFERENCE TO RELATED APPLICATIONS

The present application is a continuation-in-part of U.S. patent application Ser. No. 14/547,049, filed Nov. 18, 2014, and entitled "MULTI-LAYERED BAGS WITH DISCRETE NON-CONTINUOUS LAMINATION," which is a continuation of U.S. patent application Ser. No. 13/299,512, filed Nov. 18, 2011, and entitled "MULTI-LAYERED BAGS WITH DISCRETE NON-CONTINUOUS LAMINATION" and issued as U.S. Pat. No. 8,940,377, which is a continuation-in-part of U.S. patent application Ser. No. 12/947,025, filed Nov. 16, 2010, and entitled "DISCONTINUOUSLY LAMINATED FILM" and issued as U.S. Pat. No. 8,603,609, which claims the benefit of and priority to U.S. Provisional Application No. 61/261,673, filed Nov. 16, 2009. The contents of each of the above-referenced applications and patent(s) are hereby incorporated by reference in their entirety.

BACKGROUND

1. Technical Field

The present application relates generally to thermoplastic films and structures formed therefrom. More particularly, the present invention relates to thermoplastic films including multiple layers with differing compositions and differing functional material properties.

2. Background and Relevant Art

Thermoplastic films are a common component in various commercial and consumer products. For example, grocery bags, trash bags, sacks, and packaging materials are products that are commonly made from thermoplastic films. Additionally, feminine hygiene products, baby diapers, adult incontinence products, and many other products include thermoplastic films to one extent or another.

Thermoplastic films have a variety of different strength parameters that manufacturers of products incorporating a thermoplastic film component may attempt to manipulate to ensure that the film is suitable for use its intended use. For example, manufacturers may attempt to increase or otherwise control the tensile strength, tear resistance, and/or impact resistance of a thermoplastic film. Unfortunately, some of these properties are opposing properties (i.e., an increase in one property causes a decrease in the opposing property), and thus, are not combinable into a single commercially feasible film.

Co-extruded films are a common type of film used in many thermoplastic products. Often co-extruded films are formed in an attempt to create a film with the benefits or properties of multiple individual films or layers. Commonly, co-extruded films include a core layer sandwiched between outer skin-layers. The core layer is commonly the thickest layer and provides the foundation for the film. The outer skin layers are often tailored to provide desired properties. To help ensure adequate film strength, conventionally strong lamination strength is provided between the layers of co-extruded films to help avoid delamination. In many instances, manufacturers use a tie layer or other adhesive layer to ensure adequate lamination strength between layers. Poorly laminated films are often avoided because the can have unacceptable properties. As such, many combinations of layers with disparate properties are not viable for co-extrusion due to a tendency of such films to resist bonding during co-extrusion. Furthermore, layers with differing properties that will bond during co-extrusion can nonetheless be unsuitable for co-extrusion. For example, films with differing shrink rates can cause the co-extruded film to curl as the layers cool due to the differing shrink rates.

Manufacturers have attempted to form co-extruded films with layers with differing properties. Unfortunately, co-extruded films are typically only as strong as the weakest layer. For example, when a co-extruded film includes two layers with varying strength parameters, typically the layer with the weakest strength parameter controls the overall strength of the co-extruded film. Thus, co-extruded films may provide the visual benefits of the various layers, but typically the functional benefits of a single (i.e., weakest) layer dominates the co-extruded film.

The cost to produce products including thermoplastic film is directly related to the cost of the thermoplastic film. Recently the cost of thermoplastic materials has risen. In response, many manufacturers attempt to control manufacturing costs by decreasing the amount of thermoplastic material in a given product.

One way manufacturers may attempt to reduce production costs is to use thinner films, thereby reducing the amount of thermoplastic film needed to produce a product of a given size. Unfortunately, extruded or otherwise manufactured thermoplastic films can have undesirable properties. For example, thinner thermoplastic films are typically weaker. As such, manufacturers may be dissuaded to use thinner films despite the potential material savings. This is particularly the case when strength is a desired feature in the product.

BRIEF SUMMARY

One or more implementations of the present invention provide benefits and/or solve one or more of the foregoing or other problems in the art with non-continuously laminated structure of thermoplastic films comprising thermoplastic films with differing material compositions and differing functional benefits. In particular, one or more embodiments comprise thermoplastic films that are co-extruded separately and then combined together by a post-extrusion bonding process. The differing composition of the various films of the non-continuously laminated structure of thermoplastic films and the post-extrusion bonding process, provide the structures with the functional benefits of the individual films in a manner that the weakest layer(s) does not dominate the overall structure.

One or more embodiments include non-continuously laminated structure of thermoplastic films with unique combinations of functional benefits from the individual thermoplastic-films. For example, one or more implementations combine individual films with one or more of the scuff resistance, toughness, stretch-ability, impact resistance, high tensile strength, etc. to provide non-continuously laminated structure of thermoplastic films with varied functional benefits. One or more implementations comprise combinations of functional benefits not feasible in co-extruded films due to the tendency of the differing material compositions of the films to resist melt bonding or otherwise make the layers unsuitable for co-extrusion (e.g., differing shrink rates).

Still further, one or more implementations comprise non-continuously laminated structure of thermoplastic films with combinations of functional benefits that are typically not possible in a single film. In particular, one or more implementations comprise non-continuously laminated structure of thermoplastic films with functional benefits that are typically trade-offs or otherwise opposed. For example, one or more implementations comprise non-continuously laminated structure of thermoplastic films with both scuff resistance and high tensile strength, both stretch-ability and high tensile strength, impact resistance and high tensile strength, or tear resistance and high tensile strength.

In one or more embodiments, the lamination strength between the films of the non-continuously laminated structure of thermoplastic films is purposefully weakened such that forces acting on the non-continuously laminated structure of thermoplastic films are first absorbed by breaking the bond between films rather than, or prior to, tearing or otherwise causing the failure of the films of the non-continuously laminated structure of thermoplastic films. In particular, the bonds between the non-continuously laminated structure of thermoplastic films can be tailored to fail when subjected to forces consistent with normal use of the non-continuously laminated structure of thermoplastic films. By configuring the bonds of the non-continuously laminated structure of thermoplastic films to fail during normal use, the non-continuously laminated structure of thermoplastic films can transition into two separate films such that the functional benefits of the individual films can be fully utilized.

Additional feature and advantages of exemplary embodiments of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which:

FIGS. 1A-1C illustrate views of various films that can be combined to form a non-continuously laminated structure of thermoplastic films with differing material compositions and functional material properties in accordance with one or more implementations of the present invention;

FIG. 2 illustrates a view of a non-continuously laminated structure of thermoplastic films with differing material compositions and functional material properties in accordance with one or more implementations of the present invention;

DETAILED DESCRIPTION

Figure 3A:
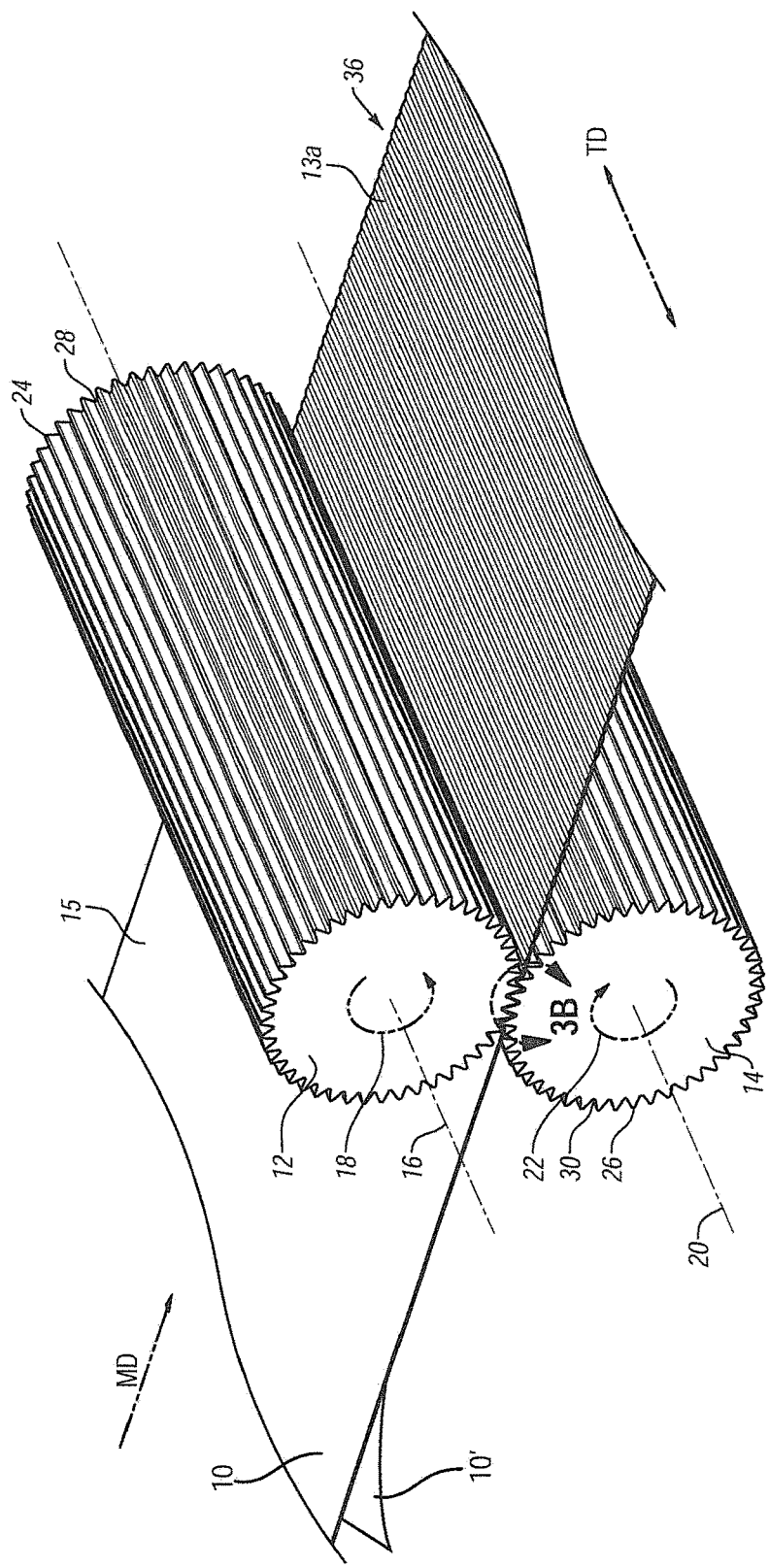
FIG. 3A illustrates a schematic diagram of two thermoplastic films being formed into a non-continuously laminated structure of thermoplastic films with differing material compositions and functional material properties by machine direction "MD" intermeshing rollers in accordance with one or more implementations of the present invention.

One or more implementations include non-continuously laminated structures of thermoplastic films comprising thermoplastic films with differing material compositions. In particular, one or more embodiments comprise thermoplastic films that are co-extruded separately and then combined together by a post-extrusion bonding process. The differing material properties of the various films of the non-continuously laminated structure of thermoplastic films and the post-extrusion bonding process, provide the structures with the functional benefits of the individual films in a manner that the weakest layer(s) does not dominate the overall structure. In other words, unlike co-extruded films, one or more embodiments combine different films in a manner (e.g., non-continuous bonding) that enables the strengths of each film to utilized without having a weakness of one film directly compromise another film.

One or more embodiments include non-continuously laminated structure of thermoplastic films with unique combinations of functional benefits from the individual thermoplastic-films. For example, one or more implementations combine individual films with differing material compositions and functional benefits. For example, a first film can comprise one or more of the scuff resistance, toughness, stretch-ability, impact resistance, high tensile strength, etc., and a second film non-continuously bonded to the first film can comprise another of the scuff resistance, toughness, stretch-ability, impact resistance, high tensile strength, etc. Thus, the continuously laminated structure of thermoplastic films can provide varied functional benefits typically non present in a single or co-extruded film. Furthermore, one or more implementations comprise combinations of functional benefits not feasible in co-extruded films due to the tendency of the differing material compositions of the layers to resist melt bonding or otherwise make the films unsuitable for co-extrusion (e.g., differing shrink rates).

Still further, one or more implementations comprise non-continuously laminated structure of thermoplastic films with combinations of functional benefits that are typically not possible in a single film. In particular, one or more implementations comprise non-continuously laminated structure of thermoplastic films with functional benefits that are typically trade-offs or otherwise opposed. For example, one or more implementations comprise non-continuously laminated structure of thermoplastic films with both scuff resistance and high tensile strength, with both stretch-ability and high tensile strength, with both impact resistance and high tensile strength, or with both tear resistance and high tensile strength.

In one or more embodiments, the lamination strength between the layers of the non-continuously laminated structure of thermoplastic films is purposefully weakened such that forces acting on the non-continuously laminated structure of thermoplastic films are first absorbed by breaking the bond between layers rather than, or prior to, tearing or otherwise causing the failure of the layers of the non-continuously laminated structure of thermoplastic films. In particular, the bonds between the non-continuously laminated structure of thermoplastic films can be tailored to fail when subjected to forces consistent with normal use of the non-continuously laminated structure of thermoplastic films. By configuring the bonds of the non-continuously laminated structure of thermoplastic films to fail during normal use, the non-continuously laminated structure of thermoplastic films can transition into two separate layers such that the functional benefits of the individual layers can be fully utilized.

In addition to the foregoing, one or more embodiments involve incrementally stretching one or more of the films of a non-continuously laminated structure of thermoplastic films. As explained below, incrementally stretching the film(s) can provide an overall thinner film employing a reduced amount of raw material that nonetheless has maintained or increased strength parameters.

In one or more embodiments the non-continuously laminated structure of thermoplastic films with differing material compositions and functional material properties can comprise one or more visual cues that indicate the use of films with differing physical properties. In particular, one or more implementations include a non-continuously laminated structure with a first layer having a first color, transparency, or translucency. The first layer is non-continuously bonded to a second layer such that the films are intermittingly in contact with each other. The second layer has a second color, transparency, or translucency that differs from the first color, transparency, or translucency. The first color, transparency, or translucency can provide a visual cue that the first layer of the non-continuously laminated structure has one (or one set of) physical properties and/or functional material benefits. The second color, transparency, or translucency can provide a visual cue that the second layer of the non-continuously laminated structure has another (or another set of) physical properties and/or functional material benefits.

In another embodiment, the visual cue can comprise a patterns, ribs, stretching or other visible characteristics. For example, in one or more implementations a non-continuously laminated structure with a first layer having a first pattern (e.g., design of incremental stretching or SELFing). The first layer is non-continuously bonded to a second layer such that the films are intermittingly in contact with each other. The second layer has a second pattern that differs from the first pattern. The first pattern can provide a visual cue that the first layer of the non-continuously laminated structure has one (or one set of) physical properties and/or functional material benefits. The second pattern can provide a visual cue that the second layer of the non-continuously laminated structure has another (or another set of) physical properties and/or functional material benefits.

As discussed above, the structures of one or more implementations can comprise multiple films (e.g., two or more) with differing physical properties/functional material benefits that are non-continuously laminated together. One or more implementations can involve laminating the layers of the non-continuously laminated structure of thermoplastic films with differing material compositions and functional material properties via ring rolling, a structural elastic like film (SELF) process, embossing, adhesives, ultrasonic bonding, or other techniques.

The non-continuous bonding can enhance the strength and other properties of the non-continuously laminated structure of thermoplastic films with differing material compositions and functional material properties. In particular, one or more implementations provide for forming bonds between adjacent films of a non-continuously laminated structure that are relatively light such that forces acting on the non-continuously laminated structure are first absorbed by breaking the bonds rather than, or prior to, tearing or otherwise causing the failure of the films of the non-continuously laminated structure. Such implementations can provide an overall thinner structure employing a reduced amount of raw material that nonetheless has maintained or increased strength parameters. Alternatively, such implementations can use a given amount of raw material and provide a structure with increased strength parameters.

In particular, the light bonds or bond regions of adjacent films of non-continuously laminated structures in accordance with one or more implementations can act to first absorb forces via breaking of the bonds prior to allowing that same force to cause failure of the individual films of the non-continuously laminated structure of thermoplastic films with differing material compositions and functional material properties. Such action can provide increased strength to the non-continuously laminated structure of thermoplastic films with differing material compositions and functional material properties. In one or more implementations, the light bonds or bond regions include a bond strength that is advantageously less than a weakest tear resistance of each of the individual films so as to cause the bonds to fail prior to failing of the films. Indeed, one or more implementations include bonds that the release just prior to any localized tearing of the layers of the non-continuously laminated structure of thermoplastic films with differing material compositions and functional material properties.

Thus, in one or more implementations, the light bonds or bond regions of a non-continuously laminated structure of thermoplastic films with differing material compositions and functional material properties can fail before either of the individual layers undergoes molecular-level deformation. For example, an applied strain can pull the light bonds or bond regions apart prior to any molecular-level deformation (stretching, tearing, puncturing, etc.) of the individual films. In other words, the light bonds or bond regions can provide less resistive force to an applied strain than molecular-level deformation of any of the layers of the non-continuously laminated structure of thermoplastic films with differing material compositions and functional material properties. The inventors have surprisingly found that such a configuration of light bonding can provide increased strength properties to the non-continuously laminated structure of thermoplastic films with differing material compositions and functional material properties as compared to a monolayer film of equal thickness or a non-continuously laminated structure in which the plurality of films are tightly bonded together or continuously bonded (e.g., coextruded).

One or more implementations of the present invention provide for tailoring the bonds or bond regions between layers of a non-continuously laminated structure of thermoplastic films with differing material compositions and functional material properties to ensure light bonding and associated increased strength. For example, one or more implementations include modifying or tailoring one or more of a bond strength, bond density, bond pattern, or bond size between adjacent layers of a non-continuously laminated structure of thermoplastic films with differing material compositions and functional material properties to deliver a structure with strength characteristics better than or equal to the sum of the strength characteristics of the individual films. Such bond tailoring can allow for non-continuously laminated structure of thermoplastic films with differing material compositions and functional material properties at a lower basis weight (amount of raw material) to perform the same as or better than higher basis weight mono-layer or co-extruded films. The bonds can be tailored such that they fail when subjected to forces and conditions consistent with normal use of a product incorporating the non-continuously laminated structure of thermoplastic films. For example, when the non-continuously laminated structure of thermoplastic films with differing material compositions and functional material properties is formed into a garbage bag, the bonds between the layers of the non-continuously laminated structure can be tailored to fail when subjected to forces consistent with objects being placed into the garbage bag, consistent with the garbage bag being removed from a container (e.g., garbage can), or consistent with the garbage bag being carried from one location to another location.

As used herein, the terms "lamination," "laminate," and "laminated film," refer to the process and resulting product made by bonding together two or more layers of film or other material. The term "bonding", when used in reference to bonding of multiple films of a non-continuously laminated structure of thermoplastic films with differing material compositions and functional material properties, may be used interchangeably with "lamination" of the layers. According to methods of one or more embodiments of the present invention, adjacent films of a non-continuously laminated structure of thermoplastic films with differing material compositions and functional material properties are laminated or bonded to one another. The bonding purposely results in a relatively weak bond between the layers that has a bond strength that is less than the strength of the weakest layer of the structure. This allows the lamination bonds to fail before the layer, and thus the structure, fails.

As a verb, "laminate" means to affix or adhere (by means of, for example, adhesive bonding, pressure bonding, ultrasonic bonding, corona lamination, heat lamination, and the like) two or more separately made film articles to one another so as to form a multilayer structure. As a noun, "laminate" means a product produced by the affixing or adhering just described.

In one or more implementations, the light lamination or bonding between films of a non-continuously laminated structure of thermoplastic films with differing material compositions and functional material properties may be non-continuous (i.e., discontinuous or partial discontinuous). As used herein the terms "discontinuous bonding" or "discontinuous lamination" refers to lamination of two or more layers where the lamination is not continuous in the machine direction and not continuous in the transverse direction. More particularly, discontinuous lamination refers to lamination of two or more layers with repeating bonded patterns broken up by repeating un-bonded areas in both the machine direction and the transverse direction of the film.

As used herein the terms "partially discontinuous bonding" or "partially discontinuous lamination" refers to lamination of two or more layers where the lamination is substantially continuous in the machine direction or in the transverse direction, but not continuous in the other of the machine direction or the transverse direction. Alternately, partially discontinuous lamination refers to lamination of two or more layers where the lamination is substantially continuous in the width of the article but not continuous in the height of the article, or substantially continuous in the height of the article but not continuous in the width of the article. More particularly, partially discontinuous lamination refers to lamination of two or more layers with repeating bonded patterns broken up by repeating unbounded areas in either the machine direction, the transverse direction or both. Both partially discontinuous and discontinuous are types of non-continuous bonding (i.e., bonding that is not complete and continuous between two surfaces).

In addition to non-continuous bonding, one or more implementations include incrementally stretching one or more films of a non-continuously laminated structure of thermoplastic films with differing material compositions and functional material properties. For example, one or more implementations includes incrementally stretching a film using MD ring rolling, TD ring rolling, DD ring rolling, the formation of strainable networks, or combinations thereof. Incrementally stretching a film using the methods described herein can impart ribs or other structures to the film and increase or otherwise modify one or more of the tensile strength, tear resistance, impact resistance, or elasticity of the film. Furthermore, one or more embodiments involve stretching processes with ambient or cold (non-heated) conditions. This differs significantly from most conventional processes that stretch films under heated conditions. Stretching under ambient or cold conditions in accordance with one or more implementations can constrain the molecules in the film so they are not as easily oriented as under heated conditions. Such cold incremental stretching can help provide the unexpected result of maintaining or increasing the strength of a thermoplastic film, despite a reduction in gauge.

Relatively weak bonding and stretching can be accomplished simultaneously through one or more suitable techniques. For example, bonding and stretching may be achieved by pressure (for example MD ring rolling, TD ring rolling, helical or DD ring rolling, stainable network lamination, or embossing), or with a combination of heat and pressure. Alternately, a manufacturer can first stretch the films and then bond the films using one or more bonding techniques. For example, one or more implementations can include ultrasonic bonding to lightly laminate the films. Alternately or additionally, adhesives can laminate the films. Treatment with a Corona discharge can enhance any of the above methods. In one or more embodiments, the contacting surfaces/layers can comprise a tacky material to facilitate lamination. Prior to lamination, the separate films can be film or can be subject to separate processes, such as stretching, slitting, coating and printing, and corona treatment.

Film Materials

As an initial matter, the thermoplastic material of the films of one or more implementations can include, but are not limited to, thermoplastic polyolefins, including polyethylene and copolymers thereof and polypropylene and copolymers thereof. The olefin based polymers can include the most common ethylene or propylene based polymers such as polyethylene, polypropylene, and copolymers such as ethylene vinylacetate (EVA), ethylene methyl acrylate (EMA) and ethylene acrylic acid (EAA), or blends of such polyolefins.

Other examples of polymers suitable for use as films in accordance with the present invention include elastomeric polymers. Suitable elastomeric polymers may also be biodegradable or environmentally degradable. Suitable elastomeric polymers for the film include poly(ethylene-butene), poly(ethylene-hexene), poly(ethylene-octene), poly(ethylene-propylene), poly(styrene-butadiene-styrene), poly(styrene-isoprene-styrene), poly(styrene-ethylene-butylene-styrene), poly(ester-ether), poly(ether-amide), poly(ethylene-vinylacetate), poly(ethylene-methylacrylate), poly(ethylene-acrylic acid), poly(ethylene butylacrylate), polyurethane, poly(ethylene-propylene-diene), ethylene-propylene rubber.

The examples and description herein below refer to films formed from linear low-density polyethylene. The term "linear low-density polyethylene" (LLDPE) as used herein is defined to mean a copolymer of ethylene and a minor amount of an olefin containing 4 to 10 carbon atoms, having a density of from about 0.910 to about 0.926, and a melt index (MI) of from about 0.5 to about 10. For example, some examples herein use an octene comonomer, solution phase LLDPE (MI=1.1; $\rho$=0.920). Additionally, other examples use a gas phase LLDPE, which is a hexene gas phase LLDPE formulated with slip/AB (MI=1.0; $\rho$=0.920). Still further examples use a gas phase LLDPE, which is a hexene gas phase LLDPE formulated with slip/AB (MI=1.0; $\rho$=0.926). One will appreciate that the present invention is not limited to LLDPE, and can include "high density polyethylene" (HDPE), "low density polyethylene" (LDPE), and "very low density polyethylene" (VLDPE). Indeed, films made from any of the previously mentioned thermoplastic materials or combinations thereof can be suitable for use with the present invention.

Indeed, implementations of the present invention can include any flexible or pliable thermoplastic material that may be formed or drawn into a web or film. Furthermore, the thermoplastic materials may include a single layer or multiple layers. The thermoplastic material may be opaque, transparent, translucent, or tinted. Furthermore, the thermoplastic material may be gas permeable or impermeable.

As used herein, the term "flexible" refers to materials that are capable of being flexed or bent, especially repeatedly, such that they are pliant and yieldable in response to externally applied forces. Accordingly, "flexible" is substantially opposite in meaning to the terms inflexible, rigid, or unyielding. Materials and structures that are flexible, therefore, may be altered in shape and structure to accommodate external forces and to conform to the shape of objects brought into contact with them without losing their integrity. In accordance with further prior art materials, web materials are provided which exhibit an "elastic-like" behavior in the direction of applied strain without the use of added traditional elastic. As used herein, the term "elastic-like" describes the behavior of web materials which when subjected to an applied strain, the web materials extend in the direction of applied strain, and when the applied strain is released the web materials return, to a degree, to their pre-strained condition.

In addition to a thermoplastic material, films of one or more implementations of the present invention can also include one or more additives. Additional additives that may be included in one or more embodiments include slip agents, anti-block agents, voiding agents, or tackifiers. Additionally, one or more implementations of the present invention include films that are devoid of voiding agents. Some examples of inorganic voiding agents include calcium carbonate, magnesium carbonate, barium carbonate, calcium sulfate, magnesium sulfate, barium sulfate, calcium oxide, magnesium oxide, titanium oxide, zinc oxide, aluminum hydroxide, magnesium hydroxide, talc, clay, silica, alumina, mica, glass powder, starch, etc. Some examples of organic voiding agents for polyethylene (PE) include polystyrene and other polymers incompatible with PE and having the proper viscosity ratio relative to PE.

As mentioned above, in one or more embodiments, the films of a non-continuously laminated structure of thermoplastic films with differing material compositions and functional material properties can comprise different colors to signify the different properties or functional benefits of the layers. The films can comprise a pigment that provides a color. As used herein, the term "pigment or pigments" are solids of an organic and inorganic nature which are defined as such when they are used within a system and incorporated into the thermoplastic, absorbing part of the light and reflecting, the complementary part thereof which forms the color of the thermoplastic ply. Representative, but not limiting, examples of suitable pigments include inorganic colored pigments such as such as iron oxide, in all their shades of yellow, brown, red and black; and in all their physical forms and particle-size categories, chromium oxide pigments, also co-precipitated with nickel and nickel titanates, blue and green pigments derived from copper phthalocyanine, also chlorinated and brominated in the various alpha, beta and epsilon crystalline forms, yellow pigments derived from lead sulphochromate, yellow pigments derived from lead bismuth vanadate, orange pigments derived from lead sulphochromate molybdate lead oxide, cadmium sulfide, cadmium selenide, lead chromate, zinc chromate, nickel titanate, and the like. For the purposes of the present invention, the term "organic pigment" comprises also black pigments resulting from organic combustion (so-called "carbon black"). Organic colored pigments include yellow pigments of an organic nature based on arylamides, orange pigments of an organic nature based on naphthol, orange pigments of an organic nature based on diketo-pyrrolo-pyrole, red pigments based on manganese salts of azo dyes, red pigments based on manganese salts of beta-oxynaphthoic acid, red organic quinacridone pigments, and red organic anthraquinone pigments. Organic colored pigments include azo and diazo pigments, phthalocyanines, quinacridone pigments, perylene pigments, isoindolinone, anthraquinones, thioindigo, solvent dyes and the like.

Pigments can be light reflecting (e.g., white pigments) or light absorbing (e.g., black pigments). Examples of pigments suitable for one or more implementations include titanium dioxide, Antimony Oxide, Zinc Oxide, White Lead, Lithopone, Clay, Magnesium Silicate, Barytes ($BaSO_4$), and Calcium Carbonate ($CaCO_3$).

In one or more embodiments, the composition of the films used to form non-continuously laminated structure of thermoplastic films are tailored to have different physical properties and/or functional benefits. In particular, at least two films of the non-continuously laminated structure of thermoplastic films comprise different material compositions, which provide the layers with differing functional material properties. As used herein, the term functional material property refers to a physical property of a film that is due to the material composition of the film and not due to post processing of the film. More specifically, a functional material property refers to a property other than visual properties (haze, clarity, transparency, opacity, transparency, color, etc.). Indeed, a functional material property refers to a property that relates to the strength, durability, and/or function of the film. For example, functional material properties include scuff resistance, tear resistance, impact resistance, tensile strength, elasticity, puncture resistance, or other functional properties of a film due to the composition of the film.

In one or more embodiments, one film layer of a non-continuously laminated structure of thermoplastic films with differing material compositions and functional material properties is a LLDPE film (e.g., LLDPE is the primary component, or in other words, the largest individual component by weight). In particular, a LLDPE film can comprise a 0.80 MI, 0.920 density hexene comonomer gas phase. As used herein a LLDPE film is treated as a control film (i.e., a film to which other films are compared). Thus, a film with high tensile strength refers to a film with a higher tensile strength than a LLDPE film (i.e., the control film) having the same thickness. A LLDPE film is used as a control film as it has a desirable mix of physical properties (e.g., tensile strength, impact and puncture resistance) and elongates under stress such that it can be used to make thinner films.

One or more implementations of a non-continuously laminated structure of thermoplastic film can comprise a layer that is scuff resistant (i.e., more scuff resistance than the control film). In one or more embodiments, a scuff resistant film comprises a film with a composition tailored to provide increased scuff resistance. For example, a scuff resistant film can comprise increased scuff resistance due to an increased film density (i.e., has a density greater than the 0.920 density of the control film) or the addition of a mineral filler such as $CaCO_3$. The mineral filler can also act as a stress whitening agent that increases the opacity of the film when stretched (i.e., when passed through intermeshing rollers).

One or more implementations of a non-continuously laminated structure of thermoplastic films with differing material compositions and functional material properties can comprise a layer that has increased toughness (i.e., higher tear and impact resistance than the control film). In one or more embodiments, a tough film comprises a film with a composition tailored to provide increased tear and impact resistance. For example, a tough film can comprise increased toughness due to the presence of an advanced technology polymer. For instance, a tough film can include at least 50% by weight of an advanced technology polymer. One example of an advanced technology polymer is Exxon XP 8656MK.

One or more implementations of a non-continuously laminated structure of thermoplastic films with differing material compositions and functional material properties can comprise a layer that has increased stretchiness (i.e., stretchier than the control film). In one or more embodiments, a stretchy film comprises a film with a composition tailored to provide increased elasticity. For example, a stretchy film can comprise increased elasticity due to the presence of an advanced catalyst mLLDPE. For instance, a stretchy film can include at least 60% by weight of an advanced catalyst mLLDPE. One example of an advanced catalyst mLLDPE is DOW INNATE ST50 mLLDPE.

Along related lines, one or more implementations of a non-continuously laminated structure of thermoplastic films with differing material compositions and functional material properties can comprise a first layer that responds to stretching in a first manner and a second layer that responds to the same stretching in a second manner. In such implementations the first and second layers can appear similar but react to stretching differently due to their different chemical compositions. As a non-limiting example, the first layer can retract a first amount when stretched while the second layer may retract a second, different amount or not retract at all.

One or more implementations of a non-continuously laminated structure of thermoplastic films with differing material compositions and functional material properties can comprise a layer that has increased impact resistance (i.e., more impact resistant than the control film). In one or more embodiments, an impact resistant film comprises a film with a composition tailored to provide increased impact resistance. For example, an impact resistant film can comprise increased impact resistance due to a decreased film density (i.e., has a density less than the 0.920 density of the control film), the additional of elastomeric materials, the use of polyethylenes with a high molecular weight (i.e., a melt index less than 0.70), or the addition of a mineral filler such as $CaCO_3$ (in one or more embodiments the mineral filler comprises up to 20% of the weight of the film). The mineral filler can also act as a stress whitening agent that increases the opacity of the film when stretched (i.e., when passed through intermeshing rollers).

One or more implementations of a non-continuously laminated structure of thermoplastic films with differing material compositions and functional material properties can comprise a layer that has high tensile strength (i.e., higher tensile strength than the control film). In one or more embodiments, a high tensile strength film comprises a film with a composition tailored to provide increased tensile strength. For example, a high tensile strength film can comprise increased tensile strength due to the presence of HDPE. For instance, a high tensile strength film can comprise HDPE as the principal component or polyethylenes with a high molecular weight (i.e., a melt index less than 0.70).

One or more embodiments of a non-continuously laminated structure of thermoplastic films with differing material compositions and functional material properties can comprise two or more films with differing material compositions that provide a unique combination of differing functional material properties. For example, one or more embodiments comprise a LLDPE (e.g., control film) and a scuff resistant film, a LLDPE film and an increased toughness film, a LLDPE film and a stretchy film, a LLDPE film and an impact resistant film, a LLDPE film and a high tensile strength film, a scuff resistant film and an increased toughness film, a scuff resistant film and a stretchy film, a scuff resistant film and an impact resistant film, a scuff resistant film and a high tensile strength film, an increased toughness film and a stretchy film, an increased toughness film and an impact resistant film, an increased toughness film and a high tensile strength film, a stretchy film and an impact resistant film, a stretchy film and a high tensile strength film, an impact resistant film and a high tensile strength film, or combinations of the foregoing.

Furthermore, while the foregoing example implementations are directed toward non-continuously laminated structure of thermoplastic films with differing material compositions and functional material properties comprising two films, one will appreciate that alternative embodiments can include more than two layers. For example, a non-continuously laminated structure of thermoplastic films with differing material compositions and functional material properties can comprise 3, 4, 5, 6, or more films of differing material compositions and functional material properties.

One will appreciate in light of the disclosure herein that manufacturers may form the films or webs to be used with one or more implementations of the present invention using a wide variety of techniques. For example, a manufacturer can form precursor mix of the thermoplastic material and one or more additives. The manufacturer can then form the film(s) from the precursor mix using conventional flat or cast extrusion or co-extrusion to produce monolayer, bilayer, or multilayer films. Alternatively, a manufacturer can form the films using suitable processes, such as, a blown film process to produce monolayer, bilayer, or multilayer films. If desired for a given end use, the manufacturer can orient the films by trapped bubble, tenterframe, or other suitable process. Additionally, the manufacturer can optionally anneal the films thereafter.

An optional part of the film-making process is a procedure known as "orientation." The orientation of a polymer is a reference to its molecular organization, i.e., the orientation of molecules relative to each other. Similarly, the process of orientation is the process by which directionality (orientation) is imposed upon the polymeric arrangements in the film. The process of orientation is employed to impart desirable properties to films, including making cast films tougher (higher tensile properties). Depending on whether the film is made by casting as a flat film or by blowing as a tubular film, the orientation process can require different procedures. This is related to the different physical characteristics possessed by films made by the two-conventional film-making processes; casting and blowing. Generally, blown films tend to have greater stiffness and toughness. By contrast, cast films usually have the advantages of greater film clarity and uniformity of thickness and flatness, generally permitting use of a wider range of polymers and producing a higher quality film.

When a film has been stretched in a single direction (monoaxial orientation), the resulting film can exhibit strength and stiffness along the direction of stretch, but can be weak in the other direction, i.e., across the stretch, often splitting when flexed or pulled. To overcome this limitation, two-way or biaxial orientation can be employed to more evenly distribute the strength qualities of the film in two directions. Most biaxial orientation processes use apparatus that stretches the film sequentially, first in one direction and then in the other.

In one or more implementations, one or more films of the present invention are blown film, or cast film. Blown film and cast film is formed by extrusion. The extruder used can be a conventional one using a die, which will provide the desired gauge. Some useful extruders are described in U.S. Pat. Nos. 4,814,135; 4,857,600; 5,076,988; 5,153,382; each of which are incorporated herein by reference in their entirety. Examples of various extruders, which can be used in producing the films to be used with the present invention, can be a single screw type modified with a blown film die, an air ring, and continuous take off equipment.

In one or more implementations, a manufacturer can use multiple extruders to supply different melt streams, which a feed block can order into different channels of a multichannel die. The multiple extruders can allow a manufacturer to form a film with layers having different compositions. Such non-continuously laminated structure of thermoplastic films with differing material compositions and functional material properties may later be non-continuously laminated with another layer of film to provide one or more benefits of the present invention.

In a blown film process, the die can be an upright cylinder with a circular opening. Rollers can pull molten plastic upward away from the die. An air-ring can cool the film as the film travels upwards. An air outlet can force compressed air into the center of the extruded circular profile, creating a bubble. The air can expand the extruded circular cross section by a multiple of the die diameter. This ratio is called the "blow-up ratio." When using a blown film process, the manufacturer can collapse the film to double the plies of the film. Alternatively, the manufacturer can cut and fold the film, or cut and leave the film unfolded.

In any event, in one or more embodiments, the extrusion process can orient the polymer chains of the blown film. The "orientation" of a polymer is a reference to its molecular organization, i.e., the orientation of molecules or polymer chains relative to each other. In particular, the extrusion process can cause the polymer chains of the blown film to be predominantly oriented in the machine direction. As used herein predominately oriented in a particular direction means that the polymer chains are more oriented in the particular direction than another direction. One will appreciate, however, that a film that is predominately oriented in a particular direction can still include polymer chains oriented in directions other than the particular direction. Thus, in one or more embodiments the initial or starting films (films before being stretched or bonded or laminated in accordance with the principles described herein) can comprise a blown film that is predominately oriented in the machine direction.

The process of blowing up the tubular stock or bubble can further orient the polymer chains of the blown film. In particular, the blow-up process can cause the polymer chains of the blown film to be bi-axially oriented. Despite being bi-axially oriented, in one or more embodiments the polymer chains of the blown film are predominantly oriented in the machine direction (i.e., oriented more in the machine direction than the transverse direction).

The films of one or more implementations of the present invention can have a starting gauge between about 0.1 mils to about 20 mils, suitably from about 0.2 mils to about 4 mils, suitably in the range of about 0.3 mils to about 2 mils, suitably from about 0.6 mils to about 1.25 mils, suitably from about 0.9 mils to about 1.1 mils, suitably from about 0.3 mils to about 0.7 mils, and suitably from about 0.35 mils and about 0.6 mils. Additionally, the starting gauge of films of one or more implementations of the present invention may not be uniform. Thus, the starting gauge of films of one or more implementations of the present invention may vary along the length and/or width of the film.

As an initial matter, one or more layers of the films described herein can comprise any flexible or pliable material comprising a thermoplastic material and that can be formed or drawn into a web or film. As described above, the film includes a plurality of layers of thermoplastic films. Each individual film layer may itself include a single layer or multiple layers. In other words, the individual layers of the non-continuously laminated structure of thermoplastic films with differing material compositions and functional material properties may each themselves comprise a plurality of laminated layers. Such layers may be significantly more tightly bonded together than the bonding provided by the purposely weak discontinuous bonding in the finished non-continuously laminated structure of thermoplastic films with differing material compositions and functional material properties. Both tight and relatively weak lamination can be accomplished by joining layers by mechanical pressure, joining layers with adhesives, joining with heat and pressure, spread coating, extrusion coating, and combinations thereof. Adjacent sub-layers of an individual layer may be coextruded. Co-extrusion results in tight bonding so that the bond strength is greater than the tear resistance of the resulting laminate (i.e., rather than allowing adjacent layers to be peeled apart through breakage of the lamination bonds, the film will tear).

FIGS. 1A-1C illustrate individual films for use in a non-continuously laminated structure of thermoplastic films with differing material compositions and functional material properties. FIG. 1A illustrates a film 10a of a single layer 11. In another implementation, as illustrated by FIG. 1B, a film 10b can have two layers (i.e., a bi-layered film). In particular, the film 10b can include a first layer 11a and a second layer 11b. The first and second layers 11a, 11b can optionally include different grades of thermoplastic material or include different additives, including polymer additives. In still another implementation, shown in FIG. 1C, a film 10c can include three layers (i.e., a tri-layered film). For example, FIG. 1C illustrates that the film 10c can include a first layer 11c, a second layer 11d, and a third layer 11e. The tri-layer film 10c can include an A:B:C configuration in which all three layers vary in one or more of gauge, composition, color, transparency, or other properties. Alternatively, the tri-layer film 10c can comprise an A:A:B structure or A:B:A structure in which two layers have the same composition, color, transparency, or other properties. In an A:A:B structure or A:B:A structure the A layers can comprise the same gauge or differing gauge. For example, in an A:A:B structure or A:B:A structure the films can comprise layer ratios of 20:20:60, 40:40:20, 15:70:15, 33:34:33, 20:60:20, 40:20:40, or other ratios.

Example control films include a three-layer B:A:B structure, where the ratio of layers can be 20:60:20. The exterior B layers (i.e., 11c, 11e) can comprise a mixture of hexene LLDPE of density 0.918, and metallocene LLDPE of density 0.920. The interior A core layer (11d) can comprise a mixture of hexene LLDPE of density 0.918, butene LLDPE of density 0.918, reclaimed resin from trash bags.

In another example, the film 10c is a coextruded three-layer B:A:B structure where the ratio of layers is 15:70:15. The B:A:B structure can also optionally have a ratio of B:A that is greater than 20:60 or less than 15:70. In one or more implementations, the LLDPE can comprise greater than 50% of the overall thermoplastic material in the film 10c.

One or more implementations involve forming a non-continuously laminated structure of thermoplastic films with differing material compositions and functional material properties from a plurality of films having different functional benefits provided by different material compositions. For example, FIG. 2 illustrates one example of a non-continuously laminated structure of thermoplastic films with differing material compositions and functional material properties 13. The non-continuously laminated structure of thermoplastic films with differing material compositions and functional material properties 13 includes a first film 10 and second film 10'. Each of the films 10, 10' can comprise any of the films 10a-10c described above or a film with more than three layers.

The first film 10 comprise a film with a first material composition and the second film can comprise a second material composition that differs from the first material composition. For example, the first film 10 can comprise one of a control film, a scuff resistant film, a tough film, a stretchy film, an impact resistant film, a high tensile strength film, or a film that provides a different functional benefit, or a film that provides a combination of the foregoing functional benefits. The second film 10' can comprise another (i.e., one differing from the first film 10) of a control film, a scuff resistant film, a tough film, a stretchy film, an impact resistant film, a high tensile strength film, or a film that provides a different functional benefit, or a film that provides a combination of the foregoing functional benefits.

As mentioned above, the first and second films 10, 10' of the non-continuously laminated structure of thermoplastic films 13 can be non-continuously bonded together. For example, FIG. 2 further illustrates that the first film 10 of the non-continuously laminated structure of thermoplastic films with differing material compositions and functional material properties 13 is discontinuously bonded to the second film 10'. In particular, the non-continuously laminated structure of thermoplastic films with differing material compositions and functional material properties 13 can include bonded regions or bonds 49 and un-bonded regions 47. For example, FIG. 2 illustrates that the films 10, 10' of the non-continuously laminated structure of thermoplastic films with differing material compositions and functional material properties 13 are laminated together at the bonds 49 which are separated by a gap or un-bonded region 47 that separates the films 10, 10'.

As shown by FIG. 2, the first film 10 can be incrementally stretched (similarly the second film 10' can optionally be incrementally stretched). For example, FIG. 2 illustrates that the first film 10 includes alternating series of stretched (or more stretched) regions or thinner webs 46 adjacent to un-stretched regions (or less stretched) or thicker ribs 44. As explained in greater detail below, the manufacturer can incrementally stretch the first film 10 using one or more of ring rolling or SELFing.

FIG. 2 illustrates that the bonded regions 49 are aligned with and co-extensive with the thicker ribs 44. One will appreciate in light of the disclosure herein that the present invention is not so limited. For example, in alternative embodiments the bonds or bonded regions 49 are aligned with but not co-extensive with the thicker ribs 44. In still further embodiments, the bonds or bonded regions 49 may cross or otherwise interface with the thicker ribs 44 but may not be aligned with or co-expensive with the thicker ribs. In yet further embodiments, the bonds or bonded regions 49 may not interface with the thicker ribs 44.

Figure 3B:
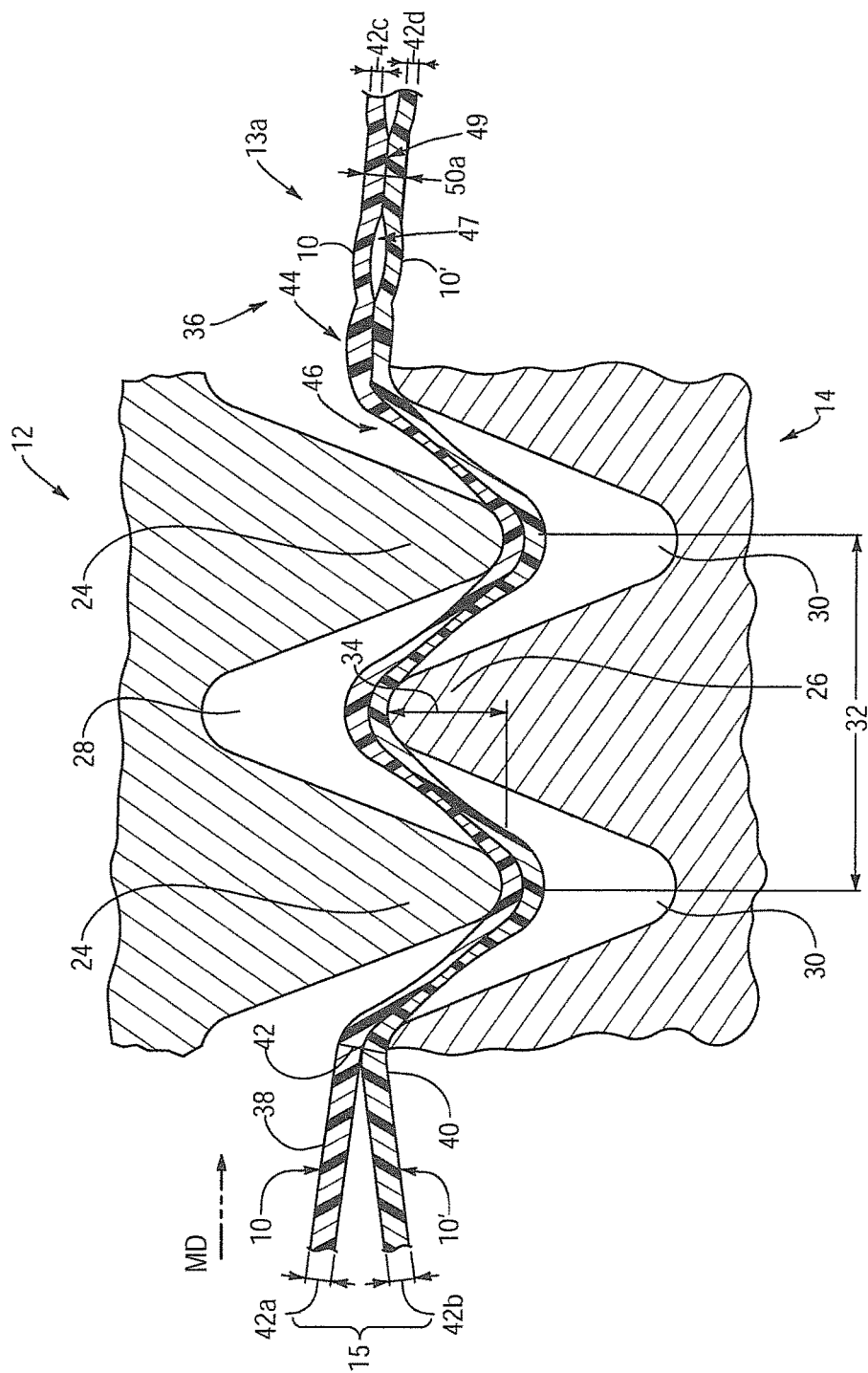
FIG. 3B illustrates an enlarged cross-sectional view of the two thermoplastic films passing together through the intermeshing rollers of FIG. 3A taken along the circle 3B of FIG. 3A.

As previously mentioned, according to one implementation of the invention, the separate films are non-continuously bonded to one another and incrementally stretched to form a non-continuously laminated structure of thermoplastic films with differing material compositions and functional material properties 13 as described above in relation to FIG. 2. FIGS. 3A-3B illustrate exemplary processes of partially discontinuously bonding adjacent films 15 (e.g., films 10, 10') in accordance with an implementation of the present invention to create a non-continuously laminated structure of thermoplastic films with differing material compositions and functional material properties 13a. In particular, FIGS. 3A-3B illustrate an MD ring rolling process that partially discontinuously laminates individual adjacent films 15 by passing the films through a pair of MD intermeshing rollers 12, 14. As a result of MD ring rolling, the non-continuously laminated structure of thermoplastic films with differing material compositions and functional material properties 13a is also intermittently stretched in the machine direction.

As shown by the FIGS. 3A-3B, the first roller 12 and the second roller 14 can each have a generally cylindrical shape. The MD intermeshing rollers 12, 14 may be made of cast and/or machined metal, such as, steel, aluminum, or any other suitable material. The MD intermeshing rollers 12, 14 can rotate in opposite directions about parallel axes of rotation. For example, FIG. 3A illustrates that the first roller 12 can rotate about a first axis 16 of rotation in a counter-clockwise direction 18. FIG. 3A also illustrates that the second roller 14 can rotate about a second axis 20 of rotation in a clockwise direction 22. The axes of rotation 16, 20 can be parallel to the transverse direction and perpendicular to the machine direction.

The intermeshing rollers 12, 14 can closely resemble fine pitch spur gears. In particular, the MD intermeshing rollers 12, 14 can include a plurality of protruding ridges 24, 26. The ridges 24, 26 can extend along the MD intermeshing rollers 12, 14 in a direction generally parallel to axes of rotation 16, 20 and perpendicular to the machine direction of the films 10, 10' passing through the MD intermeshing rollers 12, 14. Furthermore, the ridges 24, 26 can extend generally radially outward from the axes of rotation 16, 20. The tips of ridges 24, 26 can have a variety of different shapes and configurations. For example, the tips of the ridges 24, 26 can have a rounded shape as shown in FIG. 3B. In alternative implementations, the tips of the ridges 24, 26 can have sharp angled corners. FIGS. 3A-3B also illustrate that grooves 28, 30 can separate adjacent ridges 24, 26.

The ridges 24 on the first roller 12 can be offset or staggered with respect to the ridges 26 on the second roller 14. Thus, the grooves 28 of the first roller 12 can receive the ridges 26 of the second roller 14, as the MD intermeshing rollers 12, 14 intermesh. Similarly, the grooves 30 of the second roller 14 can receive the ridges 24 of the first roller 12.

One will appreciate in light of the disclosure herein that the configuration of the ridges 24, 26 and grooves 28, 30 can prevent contact between ridges 24, 26 during intermeshing so that no rotational torque is transmitted during operation. Additionally, the configuration of the ridges 24, 26 and grooves 28, 30 can affect the amount of stretching and the bond strength resulting from partially discontinuous lamination as the films 10, 10' pass through MD intermeshing rollers 12, 14.

Referring specifically to FIG. 3B, various features of the ridges 24, 26 and grooves 28, 30 are shown in greater detail. The pitch and depth of engagement of the ridges 24, 26 can determine, at least in part, the amount of incremental stretching and partially discontinuous lamination caused by the MD intermeshing rollers 12, 14. As shown by FIG. 3B, the pitch 32 is the distance between the tips of two adjacent ridges on the same roller. The "depth of engagement" ("DOE") 34 is the amount of overlap between ridges 24, 26 of the different MD intermeshing rollers 12, 14 during intermeshing.

The ratio of DOE 34 to pitch 32 can determine, at least in part, the bond strength provided by the partially discontinuous bonding. According to one embodiment, the ratio of DOE to pitch provided by any ring rolling operation is less than about 1.1:1, suitably less than about 1.0:1, suitably between about 0.5:1 and about 1.0:1, or suitably between about 0.8:1 and about 0.9:1.

As shown by FIG. 3A, the direction of travel of the films 15 through the MD intermeshing rollers 12, 14 is parallel to the machine direction and perpendicular to the transverse direction. As the thermoplastic films 15 pass between the MD intermeshing rollers 12, 14, the ridges 24, 26 can incrementally stretch the films 15 in the machine direction. In one or more implementations, stretching the films 15 in the machine direction can reduce the gauge of the film and increase the length of the films 15. In other implementations, the films 15 may rebound after stretching such that the gauge of the films 15 are not decreased (e.g., the same or larger gauge). Furthermore, in one or more implementations, stretching the films 15 in the machine direction can reduce the width of the films 15. For example, as films 15 are lengthened in the machine direction, the length of the films 15 can be reduced in the transverse direction.

In particular, as the films 15 proceed between the MD intermeshing rollers 12, 14, the ridges 24 of the first roller 12 can push the films 15 into the grooves 30 of the second roller 14 and vice versa. The pulling of the films 15 by the ridges 24, 26 can stretch the films 15. The MD intermeshing rollers 12, 14 may not stretch the films 15 evenly along their length. Specifically, the MD intermeshing rollers 12, 14 can stretch the portions of the films 15 between the ridges 24, 26 more than the portions of the films 15 that contact the ridges 24, 26. Thus, the MD intermeshing rollers 12, 14 can impart or form a generally striped pattern 36 into the films 15. As used herein, the terms "impart" and "form" refer to the creation of a desired structure or geometry in a film upon stretching the film that will at least partially retain the desired structure or geometry when the film is no longer subject to any strains or externally applied forces.

FIGS. 3A-3B illustrate that the films 15 (i.e., the films that are yet to pass through the MD intermeshing rollers 12, 14) can have a substantially flat top surface 38 and substantially flat bottom surface 40. As seen in FIG. 3B, the non-continuously laminated structure of thermoplastic films with differing material compositions and functional material properties 13 may comprise two films 10 and 10' that are initially separate from one another. The films 15 can have an initial thickness or starting gauge 42 (i.e., the sum of 42a and 42b) extending between its major surfaces (i.e., the top surface 38 and the bottom surface 40). In at least one implementation, the starting gauge 42, as well as the gauge 42a, 42b of individual films 10 and 10' can be substantially uniform along the length of the films 15. Because the contacting surfaces of each film 10 and 10' are somewhat tacky, the films become lightly bonded together as they are pulled through and stretched by MD intermeshing rollers 12, 14. Those areas that are un-stretched or stretched less become bonded together.

In one or more implementations, the films 15 need not have an entirely flat top surface 38 but may be rough or uneven. Similarly, the bottom surface 40 or the second oriented surfaces of films 10 and 10' of the films 15 can also be rough or uneven. Further, the starting gauge 42, 42a, and 42b need not be consistent or uniform throughout the entirety of films 15. Thus, the starting gauge 42, 42a, and 42b can vary due to product design, manufacturing defects, tolerances, or other processing issues. According to one embodiment, one or more of the individual films 10 and 10' may be pre-stretched (e.g., through MD ring rolling, TD ring rolling, etc.) before being positioned adjacent to the other film (10' or 10, respectively). Such pre-stretching of individual films can result in a striped surface exhibiting an uneven top and bottom surface similar to that seen in FIG. 2.

FIG. 3B illustrates that films 15, can include two initially separate films 10, 10'. In an alternative implementation, the films 15 (and thus the resultant non-continuously laminated structure of thermoplastic films with differing material compositions and functional material properties 13) can include three initially separate film films: a middle film and two first film films. In other embodiments, more than three films may be provided (four, five, six, or more partially discontinuously or discontinuously laminated films).

As seen in FIG. 3A, upon stretching and partially discontinuously laminating the adjacent films 15, the non-continuously laminated structure of thermoplastic films with differing material compositions and functional material properties 13a can include a striped pattern 36. The striped pattern 36 can include alternating series of stretched (or more stretched) regions or thinner webs 46 adjacent to un-stretched regions (or less stretched) or thicker ribs 44. FIG. 3B illustrates that the MD intermeshing rollers 12, 14 can incrementally stretch and partially discontinuously bond films 10, 10' to create the non-continuously laminated structure of thermoplastic films 13a including bonded regions or bonds 49 and un-bonded regions 47. For example, FIG. 3B illustrates that the films 10, 10' of the non-continuously laminated structure of thermoplastic films with differing material compositions and functional material properties 13a can be laminated together at the thicker ribs 44 while the stretched (i.e., thinner) regions 46 may not be laminated together.

As shown by FIG. 3B the bonded regions 49 of the non-continuously laminated structure of thermoplastic films with differing material compositions and functional material properties 13a can have an average thickness or gauge 50a. The average gauge 50a can be approximately equal to the combined starting gauges 42a, 42b of the starting films. In the Figures, separation between the layers at unbounded regions 47 is exaggerated for purposes of clarity. In one or more implementations, the average gauge 50a can be less than the combined starting gauges 42a-42b. The films 10, 10' of the un-bonded regions 47 can each have an average thickness or gauge 42c, 42d. In one or more implementations, the average gauges 42c, 42d are less than the starting gauges 42a, 42b. Although the un-stretched regions or thicker ribs 44 may be stretched to a small degree by MD intermeshing rollers 12,14 (or stretched in a separate operation), the un-stretched regions or thicker ribs 44 may be stretched significantly less compared to the stretched regions 46.

In any event, FIGS. 3A-3B illustrate that MD intermeshing rollers 12, 14 can process the initially separately layered films 15 into MD incrementally-stretched non-continuously laminated structure of thermoplastic films 13a. As previously mentioned, the MD incrementally-stretched non-continuously laminated structure of thermoplastic films 13a can include a striped pattern 36 where the bonding occurs along a continuous line or region along the width of the film, parallel to the TD direction. The striped pattern 36 can include alternating series of un-bonded regions 47 and bonded regions 49. The bonded regions 49 can comprise bonds between un-stretched regions or thicker ribs 44 of the films 10, 10'. In other words, the bonds of the MD incrementally-stretched non-continuously laminated structure of thermoplastic films with differing material compositions and functional material properties 13 can be positioned directly between, be aligned with, and bond together un-stretched regions or thicker ribs 44. Along related lines, the un-bonded regions 47 can separate the stretched or thinner regions 46.

Figure 4:
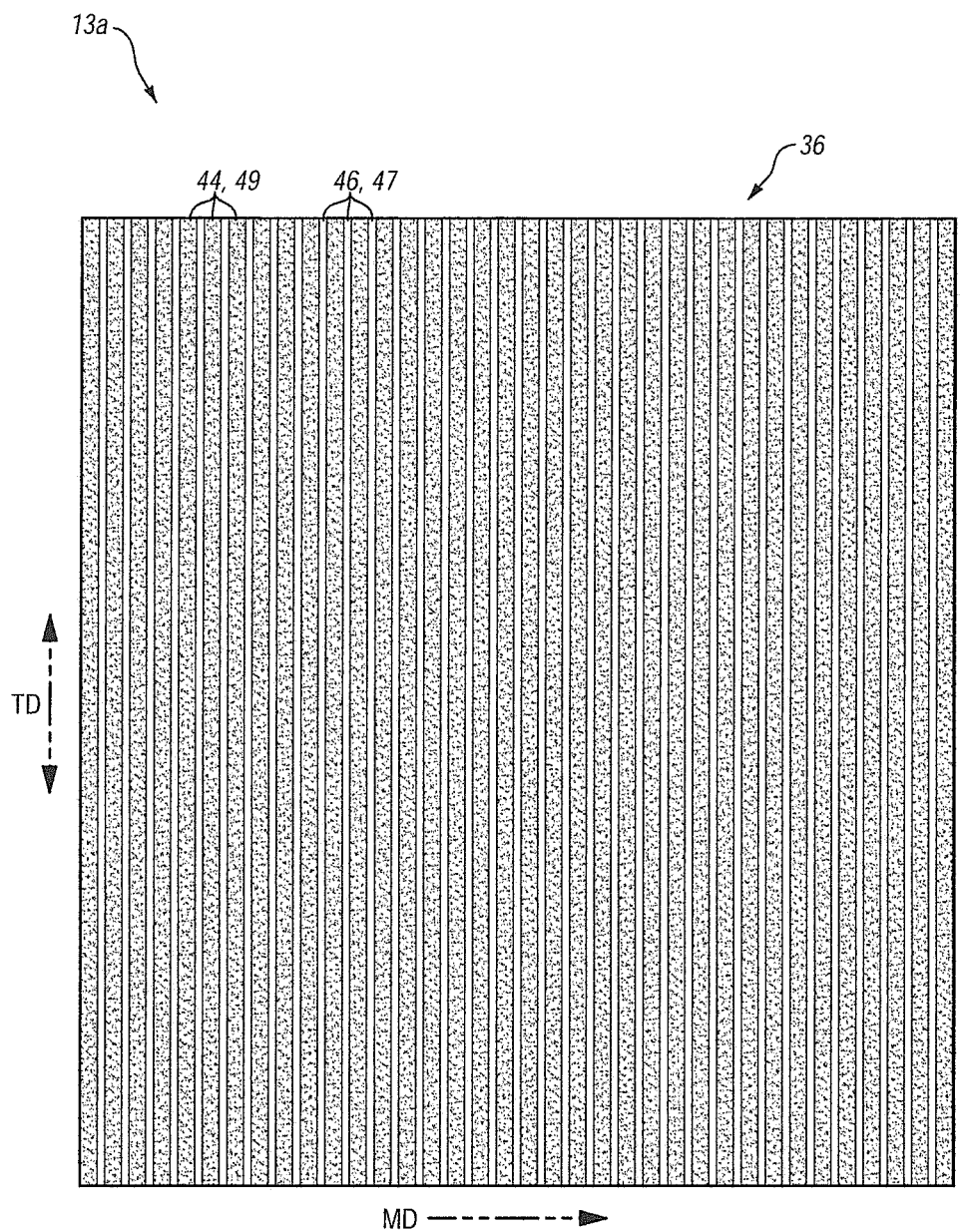
FIG. 4 illustrates a view of a non-continuously laminated structure of thermoplastic films with differing material compositions and functional material properties created by passing thermoplastic films through the intermeshing rollers of FIG. 3A.

FIG. 4 illustrates a top view of the MD incrementally-stretched non-continuously laminated structure of thermoplastic films with differing material compositions and functional material properties 13a. As shown by FIG. 4, the non-continuously laminated structure of thermoplastic films 13a includes thicker ribs 44 bonded together to form bonded regions adjacent to thinner regions 46 that form un-bonded regions. In addition to resulting in partially discontinuous lamination of adjacent layers, MD ring rolling the films 15 can increase or otherwise modify one or more of the tensile strength, tear resistance, impact resistance, or elasticity of the films 15, in addition to whatever additional strength is provided by the partially discontinuous, low strength bonds between adjacent films. Such bonds can be broken to absorb forces rather than such forces resulting in tearing of the films.

Furthermore, the thicker ribs 44 can include bonded stripes that extend across the non-continuously laminated structure of thermoplastic films 13a in a direction transverse (i.e., transverse direction) to a direction in which the film was extruded (i.e., machine direction). As shown by FIG. 4, the thicker ribs 44 (which correspond to bonded stripes or bonded regions) can extend across the entire length of the non-continuously laminated structure of thermoplastic films 13a. One will appreciate in light of the disclosure herein that the striped pattern 36 may vary depending on the method used to incrementally stretch and partially discontinuously bond adjacent layers 15. To the extent that MD or other ring rolling is used to lightly bond the non-continuously laminated structure of thermoplastic films 13a, the striped pattern 36 (e.g., width and spacing of the stripes or ribs 44) on the film 13 can depend on the pitch 32 of the ridges 24, 26, the DOE 34 (shown in FIG. 3B), and other factors. As ribs 44 represent areas of the non-continuously laminated structure of thermoplastic films 13a in which the adjacent layers are bonded to one another, it will be apparent that altering the spacing and/or width of bonds can affect the overall strength of the film. For example, providing more bonded surface area relative to the un-bonded surface area can increase the density of such bonds that can absorb forces, increasing the film strength.

FIG. 4 further illustrates that the bonded regions 49 can be intermittently dispersed about un-bonded regions 47. In particular, each bonded region 49 can reside between adjacent un-bonded regions 47. Along related lines, each thicker rib 44 can be intermittently dispersed about stretched regions 46. The striped pattern 36 may vary depending on the method used to lightly laminate the non-continuously laminated structure of thermoplastic films 13a. In one or more implementations, the molecular structure of the thermoplastic materials of the non-continuously laminated structure of thermoplastic films 13a may be rearranged during stretching (e.g., particularly so during cold stretching).

One will appreciate in light of the disclosure herein that passing the films 15 through the MD intermeshing rollers 12, 14 to form the non-continuously laminated structure of thermoplastic films with differing material compositions and functional material properties 13a can also modify the orientation of the film. In particular, MD stretching a predominately MD oriented film can further orient the stretched regions 46 in the machine direction. Thus, the stretched regions 46 can have an MD orientation that is greater than the MD orientation of the thicker ribs 44.

Figure 5A:
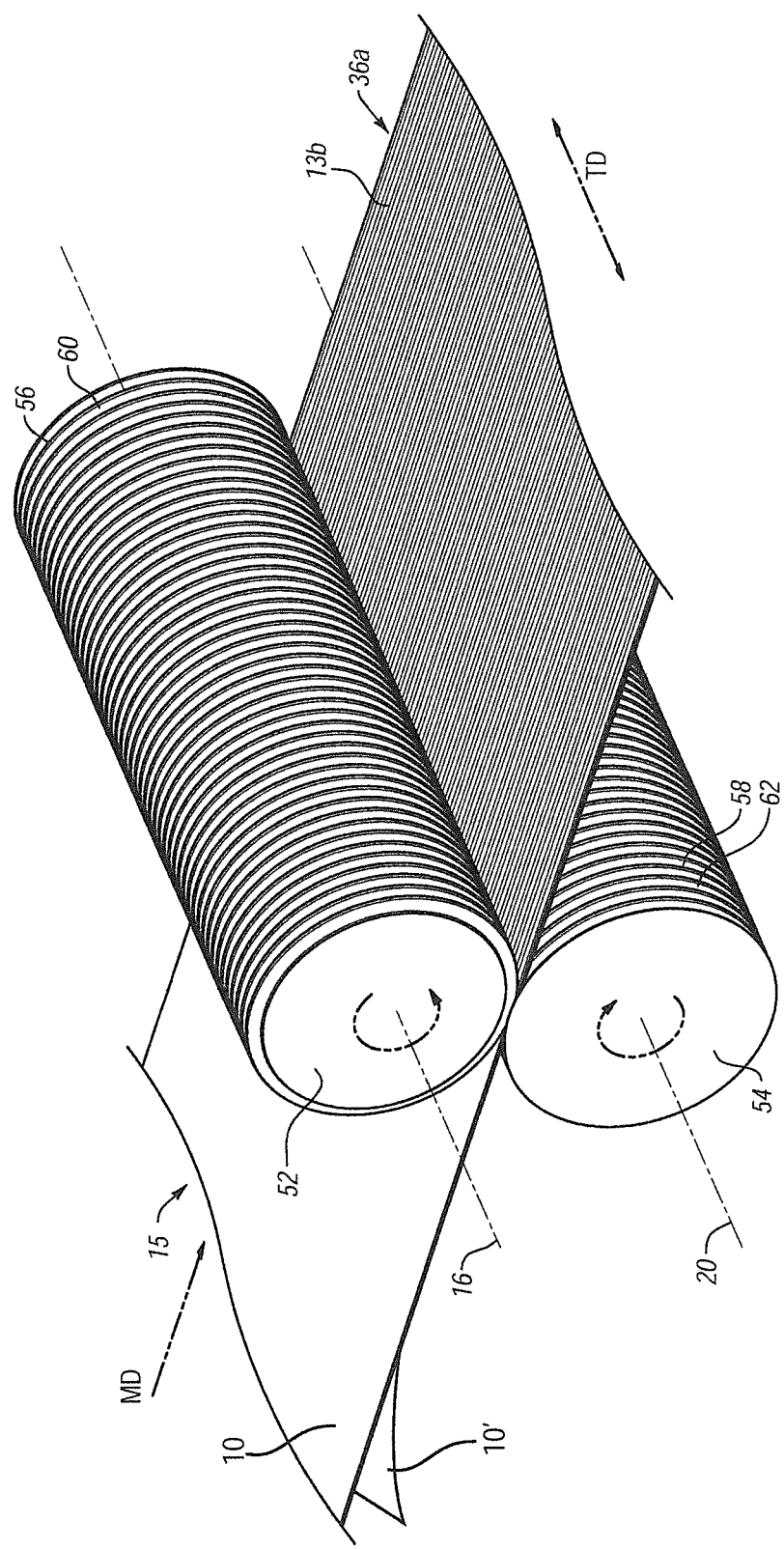
FIG. 5A illustrates a schematic diagram of two thermoplastic films being formed into a non-continuously laminated structure of thermoplastic films with differing material compositions and functional material properties by transverse direction "TD" intermeshing rollers in accordance with one or more implementations of the present invention.
Figure 5D:
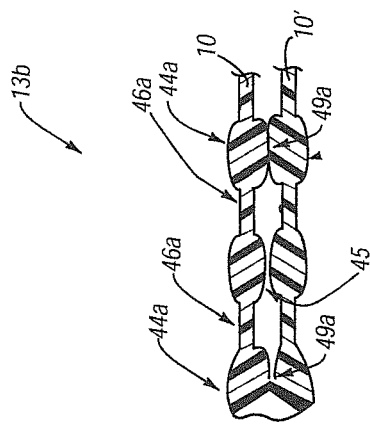
FIG. 5D illustrates an enlarged cross-sectional view of the non-continuously laminated structure of thermoplastic films with differing material compositions and functional material properties after passing through the intermeshing rollers of FIG. 5A.
Figure 5C:
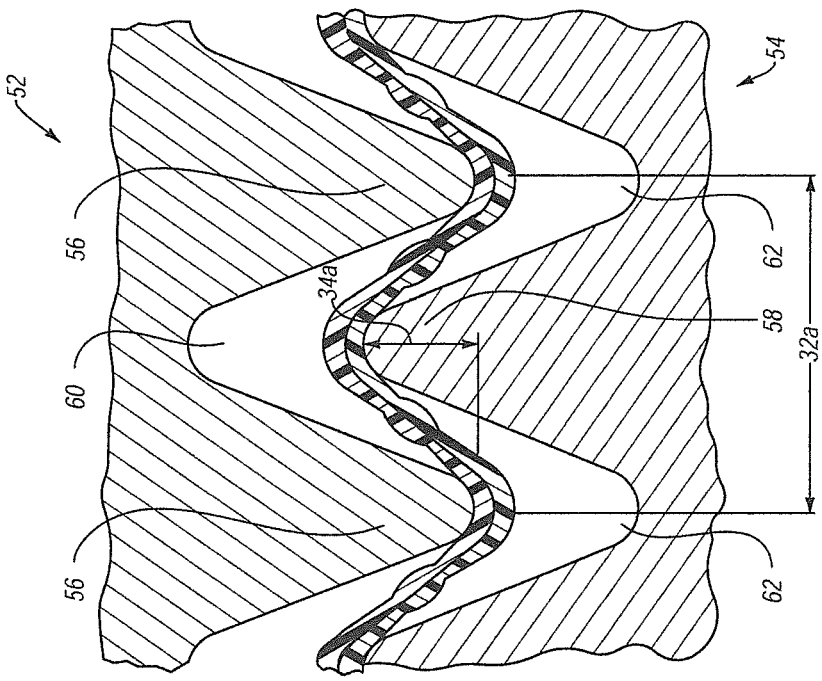
FIG. 5C illustrates an enlarged cross-sectional view of the films passing through the intermeshing rollers of FIG. 5A taken through the film and intermeshing rollers along a plane passing through the axes of the intermeshing rollers.
Figure 5B:
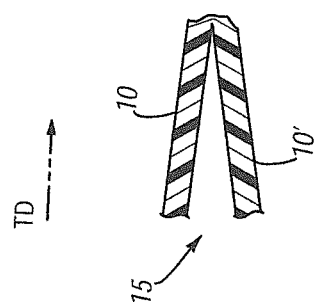
FIG. 5B illustrates an enlarged cross-sectional view of the films of FIG. 5A prior to passing through the intermeshing rollers of FIG. 5A.

MD ring rolling is one exemplary method of partially discontinuously laminating a non-continuously laminated structure of thermoplastic films with differing material compositions and functional material properties. TD ring rolling is another suitable method of discontinuously or partially discontinuously laminating a film. For example, FIGS. 5A-5D illustrates a TD ring rolling process that partially discontinuously and lightly bonds adjacent films 15 (e.g., films 10, 10') by passing the films 15 through a pair of TD intermeshing rollers 52, 54. In particular, FIG. 5B illustrates thermoplastic films 15 prior to passing the film through the pair of TD intermeshing rollers 52, 54. FIG. 5C illustrates the thermoplastic films 15 as the films passes through the pair of TD intermeshing rollers 52, 54. FIG. 5D illustrates a resultant non-continuously laminated structure of thermoplastic films with differing material compositions and functional material properties 13b created from the thermoplastic films 15 passing through the pair of TD intermeshing rollers 52, 54.

A TD ring rolling process (and associated TD intermeshing rollers 52, 54) can be similar to the MD ring rolling process (and associated MD intermeshing rollers 12, 14) described herein above, except that the ridges 56, 58 and grooves 60, 62 of the TD intermeshing rollers 52, 54 extend generally orthogonally to the axes of rotation 16, 20 (i.e., parallel to the MD direction). Thus, as shown by FIG. 5A, as the thermoplastic films 15 passes between the intermeshing rollers 52, 54, the ridges 56, 58 can incrementally stretch and lightly bond adjacent films 15. The resultant TD incrementally-stretched and incrementally-bonded non-continuously laminated structure of thermoplastic films with differing material compositions and functional material properties 13b can include a striped pattern 36a formed by adjacent bonded (thicker regions) and un-bonded regions (thinner regions).

In particular, as the films 10, 10' proceed between the TD intermeshing rollers 52, 54, the ridges 56 of the first roller 52 can push the films 10, 10' into the grooves 62 of the second roller 54 and vice versa. The pulling of the films 10, 10' by the ridges 56, 58 can stretch the films 10, 10'. The rollers 52, 54 may not stretch the films 10, 10' evenly along their length. Specifically, the rollers 52, 54 can stretch the portions of the films 10, 10' between the ridges 56, 58 more than the portions of the films 10, 10' that contact the ridges 56, 58, or vice versa. Thus, the rollers 52, 54 can impart or form a ribbed pattern 36a into resultant non-continuously laminated structure of thermoplastic films with differing material compositions and functional material properties 13b.

The TD intermeshing rollers 52, 54 can form thick regions or thicker ribs 44a, thinner webs 46a, and bonds 49a in the films 10, 10'. In one or more implementations, the adjacent thick ribs 44a of the films 10, 10' can be joined by bonds 49a. In addition to forming ribs 46a, 44a and bonds 49a, TD ring rolling the films 10, 10' can increase or otherwise modify one or more of the tensile strength, tear resistance, impact resistance, or elasticity of the films 10, 10', in addition to whatever additional strength is provided by the partially discontinuous bonds 49a between adjacent layers.

To the extent that TD or other ring rolling is used to bond the films 10, 10', the ribbed pattern 36a (e.g., width and spacing of the webs 46a, and ribs 44a) can depend on the pitch 32a of the ridges 56, 58, the DOE, and other factors. As portions of the films 10, 10' including a ribbed pattern also represent areas of the non-continuously laminated structure of thermoplastic films with differing material compositions and functional material properties in which the adjacent layers are non-continuously bonded to one another, it will be apparent that altering the spacing and/or width of ribs 44a and webs 46a can affect the overall strength of the structure. For example, providing more bonded surface area relative to the un-bonded surface area can increase the density of such bonds 49a that can absorb forces, increasing the film strength.

FIG. 5D further illustrates that the bonds 49a can bond thick linear ribs 44a of the layers 10, 10' together. In particular, the bonds 49a can be coextensive and aligned with opposing thicker ribs 44a and bond them together. FIG. 5D illustrates that the bonds 49a can secure some, but not all, of the thick linear ribs 44a of one layer to the thick linear ribs 44a of an adjacent layer. In particular, FIG. 5D illustrates that bonds 49a can secure every other thick linear rib 44a of adjacent films together. The unbounded thicker ribs 44a can form unbounded regions 45. In alternative implementations, bonds 49a can secure each thick linear rib 44a of adjacent layer together.

Figure 6:
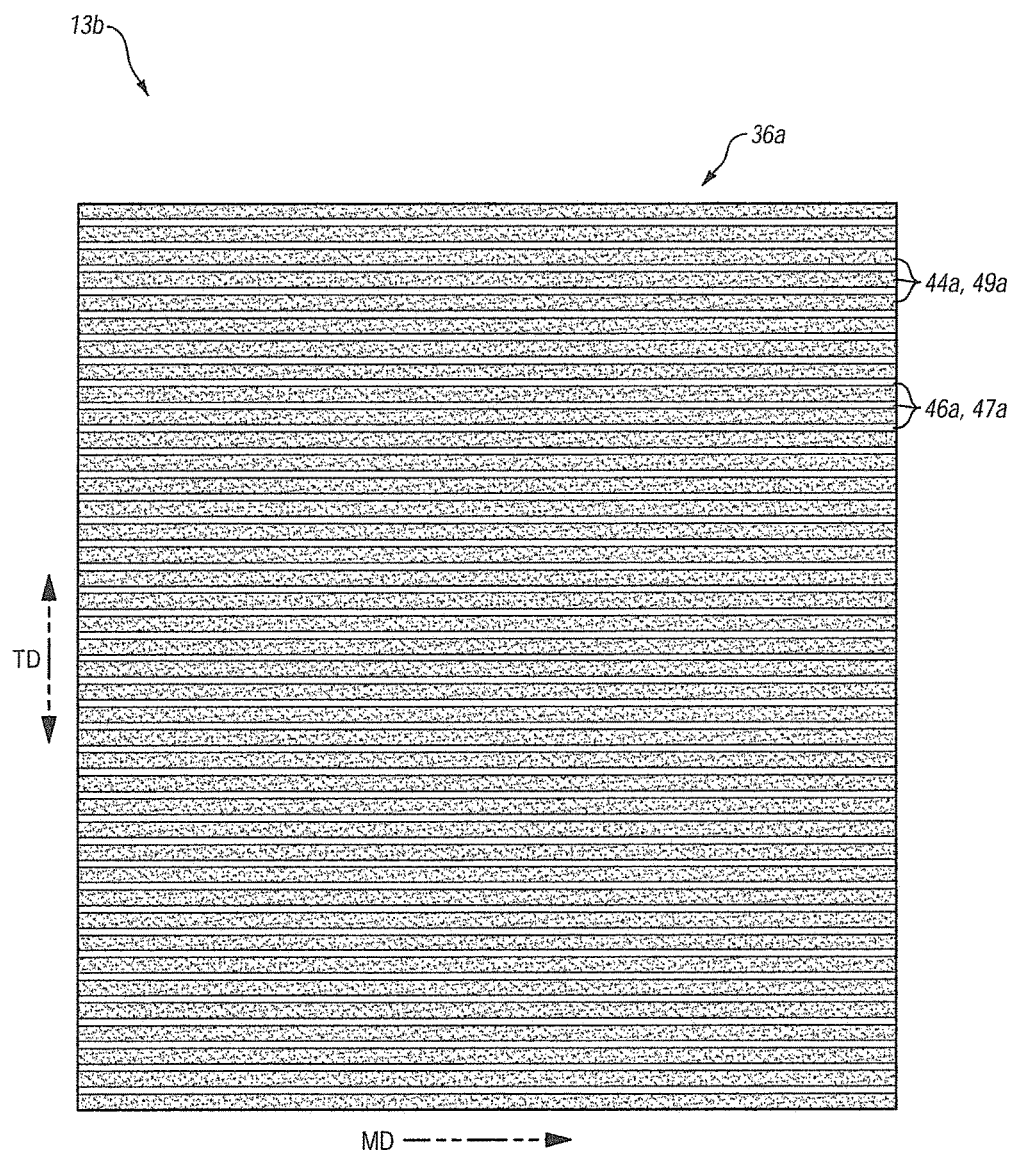
FIG. 6 illustrates a view of a non-continuously laminated structure of thermoplastic films with differing material compositions and functional material properties created by passing thermoplastic films through the intermeshing rollers of FIG. 5A.

FIG. 6 illustrates a top view of the TD incrementally-stretched and incrementally-bonded non-continuously laminated structure of thermoplastic films with differing material compositions and functional material properties 13b. As shown by FIG. 6, the non-continuously laminated structure of thermoplastic films with differing material compositions and functional material properties 13b includes thicker ribs 44a bonded together to form bonded regions 49a adjacent to thinner regions 46a that form un-bonded regions 47a. Similar to MD ring rolling, TD ring rolling the thermoplastic films can result in relatively light, partially discontinuous bonding of adjacent layers, increasing the strength of the non-continuously laminated structure of thermoplastic films with differing material compositions and functional material properties 13b.

FIG. 6 illustrates that the bonded regions 49a can include stripes that extend across the non-continuously laminated structure of thermoplastic films 13a in the machine direction. As shown by FIG. 6, the stripes or bonded regions 49a can extend across the entire width of the non-continuously laminated structure of thermoplastic films 13a. In alternative implementations, bonded regions 49a can extend across only a portion of the non-continuously laminated structure of thermoplastic films 13a. Similar to MD ring rolling, the pitch and the DOE of the ridges 56, 58 of the intermeshing rollers 52, 54 can affect the width and spacing of the stripes or bonded regions 49a, as well as the strength of the light bonds formed between adjacent layers, thereby affecting the overall increase in strength provided by the processing.

Figure 7:
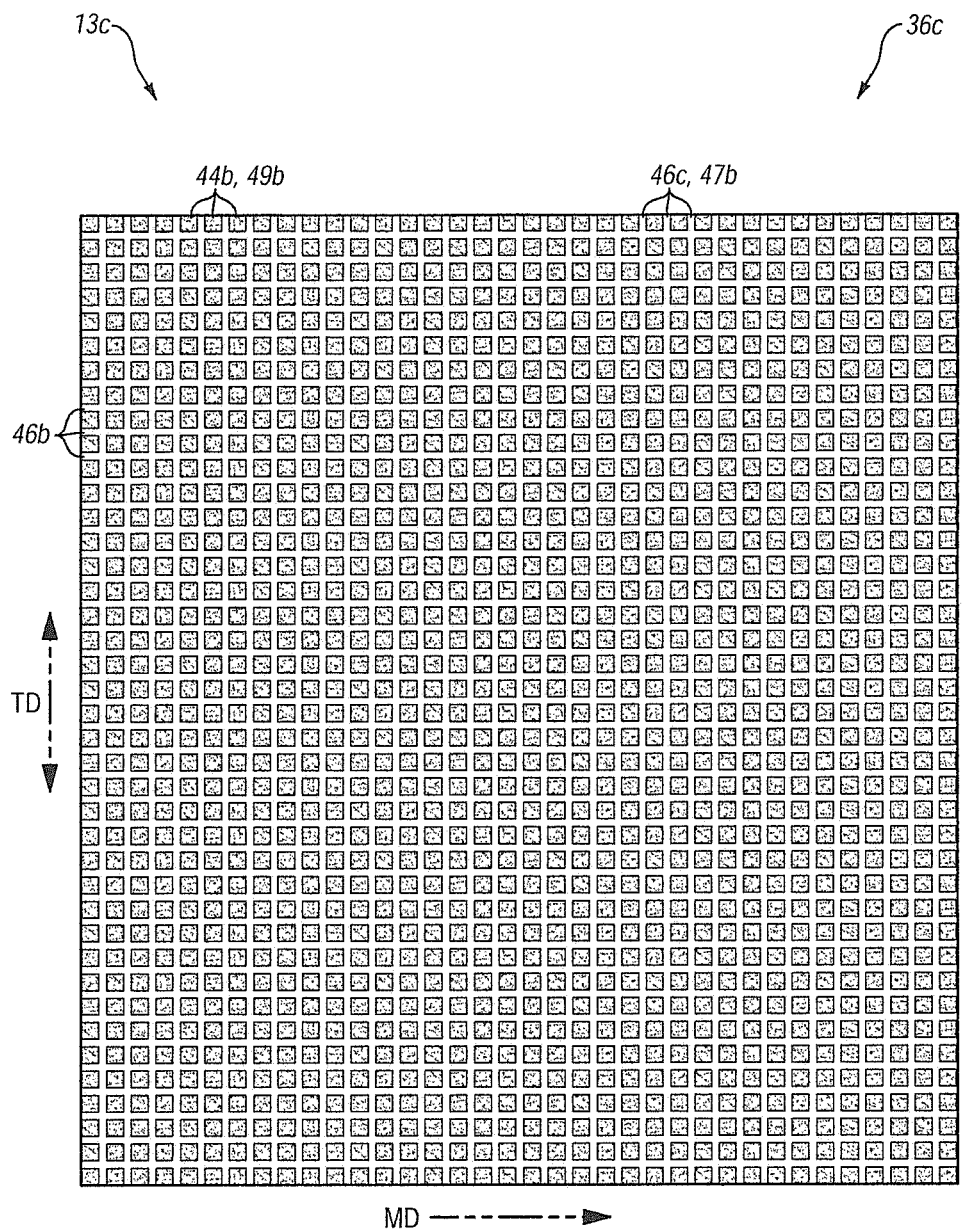
FIG. 7 illustrates a view of a non-continuously laminated structure of thermoplastic films with differing material compositions and functional material properties created by passing thermoplastic films through the intermeshing rollers of both FIG. 3A and FIG. 5A.

In still further implementations, one or more of the films 10, 10' can undergo both an MD ring rolling process and a TD ring rolling process to create the non-continuously laminated structure of thermoplastic films with differing material compositions and functional material properties. For example, FIG. 7 illustrates a top view of a MD & TD incrementally-stretched and incrementally-bonded non-continuously laminated structure of thermoplastic films with differing material compositions and functional material properties 13c. The non-continuously laminated structure of thermoplastic films with differing material compositions and functional material properties 13c includes thicker ribs 44b, 44c bonded together to form bonded regions adjacent to thinner regions 46b that form un-bonded regions. The non-continuously laminated structure of thermoplastic films with differing material compositions and functional material properties 13c can have a grid pattern 36c including alternating series of un-bonded regions 47b and bonded regions 49b, 49c. In particular, un-bonded regions 47b may comprise a plurality of discrete squares or rectangles while the remainder of the surface comprises a grid of horizontal and vertical bonded regions that are connected together. The bonded regions 49b, 49c can include stripes 49b that extend along the non-continuously laminated structure of thermoplastic films 13c in the machine direction, and stripes 49c that extend along the film in the transverse direction, which cross each other. As shown by FIG. 7, in one or more implementations, the aspect ratio of the rows and columns of the bonded regions 49b, 49c can be approximately 1 to 1. In alternative implementations, the aspect ratio of the rows and columns of bonded regions 49b, 49c can be greater or less than 1 to 1.

The non-continuously laminated structure of thermoplastic films with differing material compositions and functional material properties 13c with bonded regions and adjacent un-bonded regions created by MD and TD ring rolling can allow for greater material savings by further increasing the surface area of a given portion of film, by increasing the density of light lamination bonds within a given area, and may also provide properties or advantages not obtained by MD or TD ring rolling alone.

FIG. 7 illustrates a non-continuously laminated structure of thermoplastic films with differing material compositions and functional material properties 13c in which both the first film 10 and the second film 10' passed together through the MD ring rollers 12, 14 and the TD ring rollers 52, 54. In alternative embodiments, one of the first film 10 and the second film 10' can pass through one of the MD or TD ring rollers separately prior to the films 15 passing together through the other of the MD or TD ring rollers.

Figure 8:
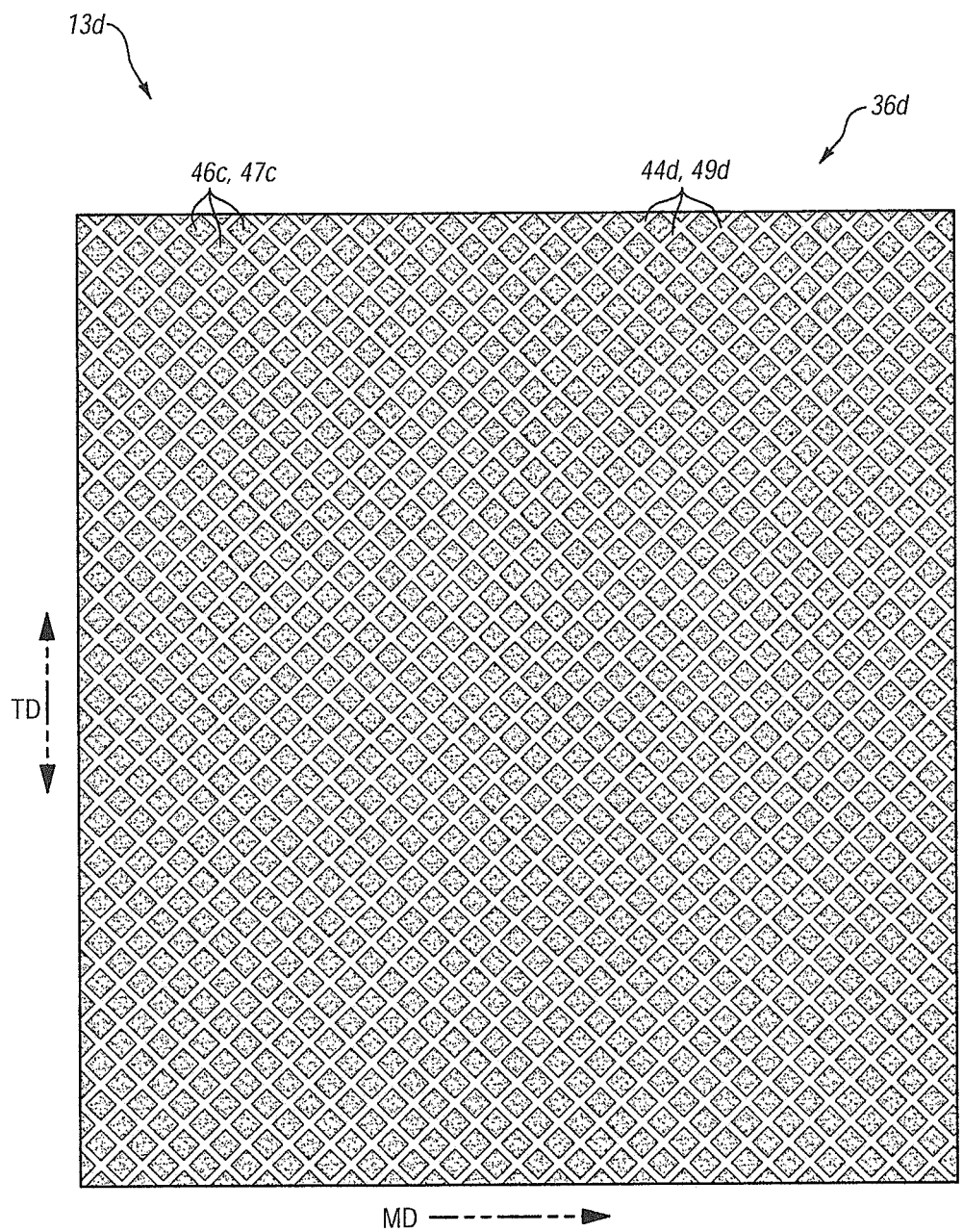
FIG. 8 illustrates a view of a non-continuously laminated structure of thermoplastic films with differing material compositions and functional material properties created by passing thermoplastic films through diagonal direction "DD" intermeshing rollers in accordance with one or more implementations of the present invention.

In yet further implementations, a manufacturer can use DD ring rolling. DD ring rolling processes (and associated DD intermeshing rollers) can be similar to the MD ring rolling process (and associated MD intermeshing rollers 12, 14) described herein above, except that the ridges and grooves of the DD intermeshing rollers can extend at an angle relative to the axes of rotation. In particular, the ridges and grooves of the DD ring rollers can extend at an angle of between about 15 degrees and about 75 degrees relative to the axes of rotation (or the MD or TD directions). FIG. 8 illustrates a DD incrementally-stretched and incrementally-bonded non-continuously laminated structure of thermoplastic films with differing material compositions and functional material properties 13d formed by bonding two films together by passing the films through DD ring rollers. As shown the non-continuously laminated structure of thermoplastic films with differing material compositions and functional material properties 13d can have a diamond pattern 36d. The diamond pattern 36d can include alternating series of diamond-shaped thinner regions 46c defining un-bonded areas or regions 47c and thicker ribs 44a secured by bonds to form bonded regions 49d.

The bonded regions can include stripes 49d oriented at an angle relative to the transverse direction such that the stripes 49d are neither parallel to the transverse or machine direction. The illustrated configuration may be achieved with two ring rolling operations, similar to that of FIG. 7, but in which the DD ring rollers of each operation are angularly offset relative to one another (e.g., one providing an angle of about 45° off of MD ring rolling, the other providing an angle of about 45° off of TD ring rolling). One will appreciate that DD ring rolling the film can biaxially orient the thinner, stretched regions 46c. In particular, orient the thinner, stretched regions 46c at an angle to the machine direction and the transverse direction. Furthermore, the bonded regions 49d can be visually-distinct from the non-bonded regions 47c as describe above in relation to the bonded regions 49-49c and non-bonded regions 47-47b.

In accordance with another implementation, a structural elastic like film (SELF) process may be used to create a thermoplastic film with strainable networks, which similarly results in discontinuous bonding of adjacent layers within a non-continuously laminated structure of thermoplastic films with differing material compositions and functional material properties. As explained in greater detail below, the strainable networks can include adjacent bonded and un-bonded regions. U.S. Pat. Nos. 5,518,801; 6,139,185; 6,150,647; 6,394,651; 6,394,652; 6,513,975; 6,695,476; U.S. Patent Application Publication No. 2004/0134923; and U.S. Patent Application Publication No. 2006/0093766 each disclose processes for forming strainable networks or patterns of strainable networks suitable for use with implementations of the present invention. The contents of each of the aforementioned patents and publications are incorporated in their entirety by reference herein. As used herein, the term "strainable network" refers to an interconnected and inter-related group of regions which are able to be extended to some useful degree in a predetermined direction providing the web material with an elastic-like behavior in response to an applied and subsequently released elongation.

Figure 9:
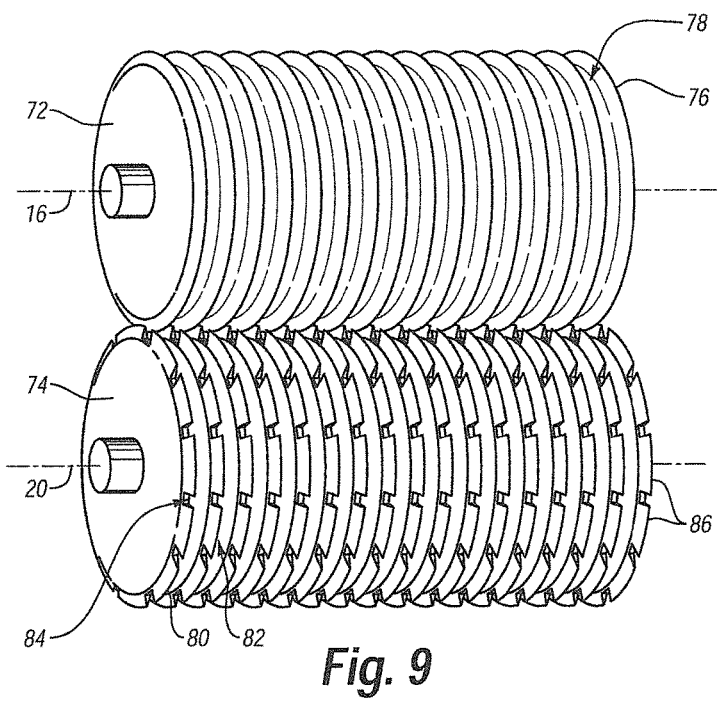
FIG. 9 illustrates a schematic diagram of a set of intermeshing rollers used to form a structural elastic like film (SELF) by imparting strainable networks into the film while lightly laminating adjacent layers of a film in accordance with one or more implementations of the present invention.

FIG. 9 illustrates a pair of SELF'ing intermeshing rollers 72, 74 for creating strainable networks with lightly bonded regions in a film. The first SELF'ing intermeshing roller 72 can include a plurality of ridges 76 and grooves 78 extending generally radially outward in a direction orthogonal to an axis of rotation 16. Thus, the first SELF'ing intermeshing roller 72 can be similar to a TD intermeshing roller 52, 54. The second SELF'ing intermeshing roller 74 can include also include a plurality of ridges 80 and grooves 82 extending generally radially outward in a direction orthogonal to an axis of rotation 20. As shown by FIG. 9, however, the ridges 80 of the second SELF'ing intermeshing roller 74 can include a plurality of notches 84 that define a plurality of spaced teeth 86.

Figure 10:
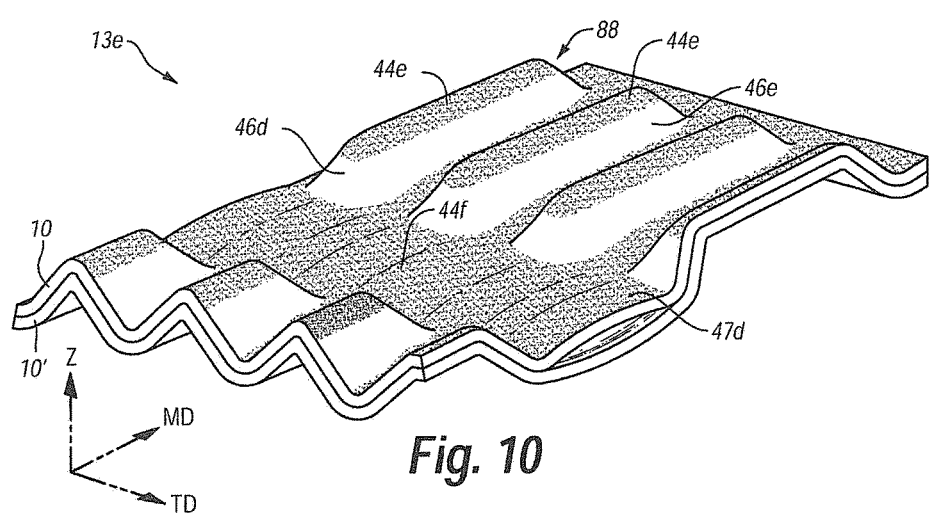
FIG. 10 illustrates a side view of a non-continuously laminated structure of thermoplastic films with differing material compositions and functional material properties created by passing thermoplastic films through the intermeshing rollers of FIG. 9.

Referring now to FIG. 10, a non-continuously laminated structure of thermoplastic films with differing material compositions and functional material properties 13e with bonded regions dispersed about un-bonded regions created using the SELF'ing intermeshing rollers 72, 74 is shown. In particular, as the films 10, 10' pass through the SELF'ing intermeshing rollers 72, 74, the teeth 86 can press a portion of the films out of plane to cause permanent deformation of a portion of the film in the Z-direction. The portions of the films that pass between the notched regions 84 of the teeth 86 will be substantially unformed in the Z-direction, resulting in a plurality of deformed, raised, rib-like elements 44e. The length and width of rib-like elements 44e depends on the length and width of teeth 86.

As shown by FIG. 10, the strainable network of the non-continuously laminated structure of thermoplastic films with differing material compositions and functional material properties 13e can include first thicker regions 44e, second thicker regions 44f, stretched, thinner transitional regions 46d connecting the first and second thicker regions 44e, 44f. The first thicker regions 44e and the stretched, thinner regions 46d can form the raised rib-like elements 88 of the strainable network. In one or more embodiments, the rib-like elements 88 can comprise bonded regions 49e can be discontinuous or separated as they extend across the non-continuously laminated structure of thermoplastic films 13d in both transverse and machine directions. This is in contrast to stripes that extend continuously across a film in one of the machine or transverse directions.

The rib-like elements 88 can allow the non-continuously laminated structure of thermoplastic films 13e to undergo a substantially "geometric deformation" prior to a "molecular-level deformation." As used herein, the term "molecular-level deformation" refers to deformation, which occurs on a molecular level and is not discernible to the normal naked eye. That is, even though one may be able to discern the effect of molecular-level deformation, e.g., elongation or tearing of the film, one is not able to discern the deformation, which allows or causes it to happen. This is in contrast to the term "geometric deformation," which refers to deformations of non-continuously laminated structure of thermoplastic films with differing material compositions and functional material properties 13e which are generally discernible to the normal naked eye when the non-continuously laminated structure of thermoplastic films with differing material compositions and functional material properties 13e or articles embodying the non-continuously laminated structure of thermoplastic films with differing material compositions and functional material properties 13e are subjected to an applied strain. Types of geometric deformation include, but are not limited to bending, unfolding, and rotating.

Thus, upon application of strain, the rib-like elements 88 can undergo geometric deformation before either the rib-like elements 88 or the flat regions undergo molecular-level deformation. For example, an applied strain can pull the rib-like elements 88 back into plane with the flat regions prior to any molecular-level deformation of the non-continuously laminated structure of thermoplastic films with differing material compositions and functional material properties 13e. Geometric deformation can result in significantly less resistive forces to an applied strain than that exhibited by molecular-level deformation.

In addition to improved properties thus provided by the ability to geometrically deform, the SELF'ing process also discontinuously and lightly laminates adjacent layers of the non-continuously laminated structure of thermoplastic films with differing material compositions and functional material properties together, providing the benefits noted above. In particularly, the films 10, 10' can be lightly laminated at regions 49e, but un-bonded at regions 47d. The strength of the lamination bond is relatively weak, so as to be less than the weakest tear resistance of the individual films of the non-continuously laminated structure of thermoplastic films with differing material compositions and functional material properties. Thus, the lamination bond is broken rather than the individual film tearing upon application of a force. Typically, tearing in the MD direction requires less applied force than tearing in the TD direction, thus in one embodiment, the lamination bond strength is less than the MD tear resistance of each individual film of the non-continuously laminated structure of thermoplastic films with differing material compositions and functional material properties.

Figure 11:
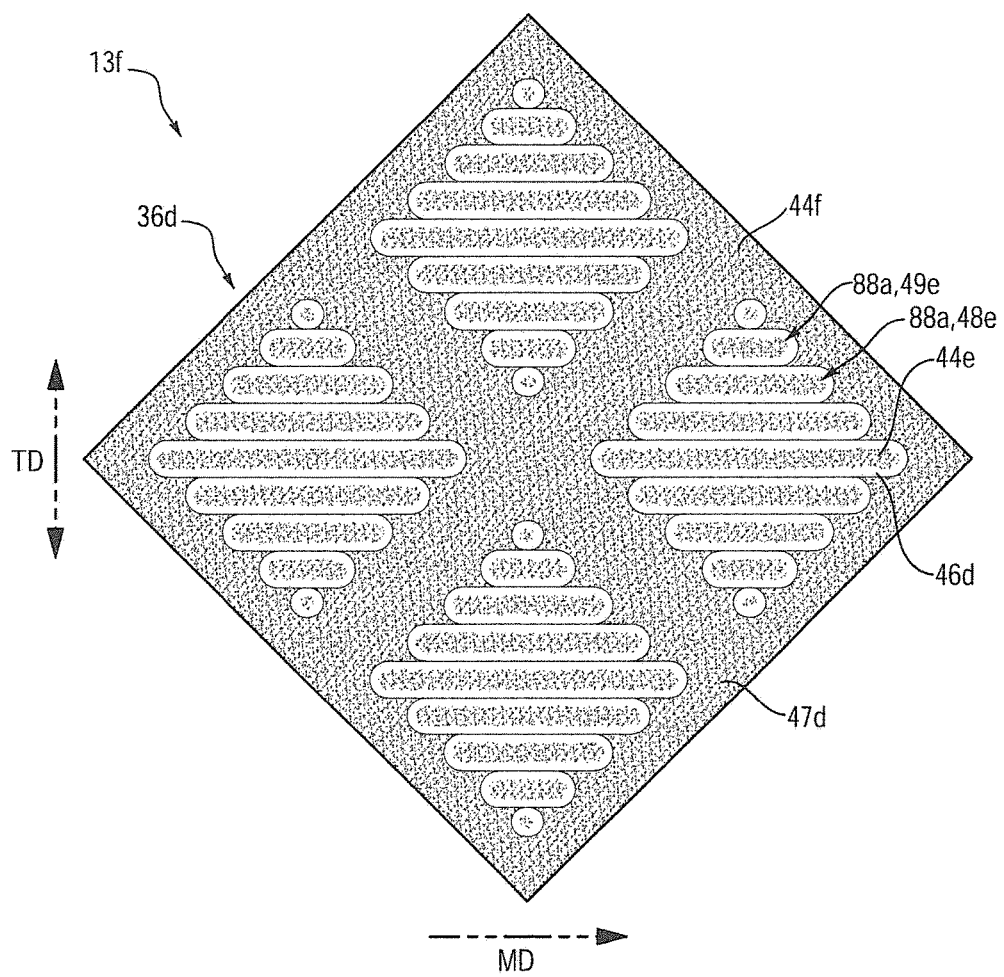
FIG. 11 illustrates a top view of a non-continuously laminated structure of thermoplastic films with differing material compositions and functional material properties including strainable networks in accordance with one or more implementations of the present invention.

FIG. 11 illustrates a non-continuously laminated structure of thermoplastic films with differing material compositions and functional material properties 13f with a strainable network of rib-like elements 88a arranged in diamond patterns. The strainable network of the non-continuously laminated structure of thermoplastic films with differing material compositions and functional material properties 13e can include first thicker regions 44e, second thicker regions 44f, stretched, thinner transitional regions 46d connecting the first and second thicker regions 44e, 44f. The first thicker regions 44e and the stretched, thinner regions 46d can form the raised rib-like elements 88a of the strainable network. In one or more embodiments, the rib-like elements 88a can comprise bonded regions 49e. Furthermore, the bonded regions 49e can be visually-distinct from the non-bonded regions 47d as describe above in relation to the bonded regions 49-49c and non-bonded regions 47-47b.

One or more implementations of the present invention can include strainable network patterns other than those shown by FIGS. 10 and 11, or combinations of various patterns. It should be understood that the term "pattern" is intended to include continuous or discontinuous sections of patterns, such as may result, for example, from the intersection of first and second patterns with each other. Furthermore, the patterns can be aligned in columns and rows aligned in the machine direction, the transverse direction, or neither the machine nor transverse directions.

One will appreciate in light of the disclosure herein that using ring rolling and/or SELFing to form the light bonds can provide the additional benefit of stretching the films, thereby reducing the basis weight of the multi-layered lightly-laminated film. Thus, using incremental stretching to form the light bonds can allow for non-continuously laminated structure of thermoplastic films with differing material compositions and functional material properties at a lower basis weight (amount of raw material) to perform the same as or better than higher basis weight mono-layer or co-extruded films.

Additionally, or alternatively to ring rolling and SELFing, one or more implementations include using embossing, stamping, adhesive lamination, ultrasonic bonding, or other methods of laminating films of a multilayer film or creating visually-distinct areas by bringing a first film 10 into direct contact with a second film 10'. In such implementations, one or more of the films of the non-continuously laminated structure of thermoplastic films with differing material compositions and functional material properties can be stretched to reduce the basis weight and/or modify the strength parameters of the film prior to lamination. Stretching of the individual films can include incrementally-stretching (e.g., ring rolling, SELFing) or continuous stretching (e.g., MDO).

Figure 12:
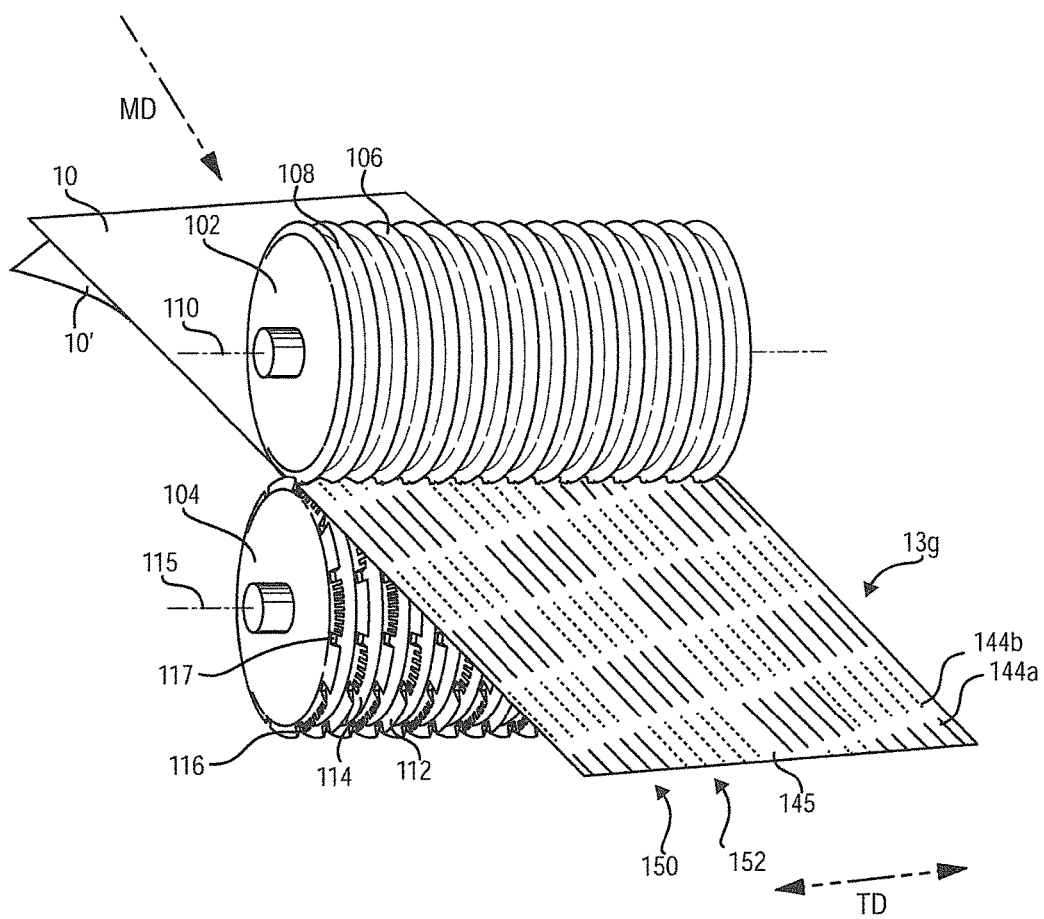
FIG. 12 illustrates a schematic diagram of two thermoplastic films being formed into a non-continuously laminated structure of thermoplastic films with differing material compositions and functional material properties with micro and macro stretch patterns by SELFing intermeshing rollers in accordance with one or more implementations of the present invention.

In additional embodiments, a non-continuously laminated structure of thermoplastic films can be formed using a modified SELFing process that creates micro and macro bonding patterns. FIG. 12 shows a pair of SELF'ing intermeshing rollers 102, 104 (e.g., a first SELF'ing intermeshing roller 102 and a second SELF'ing intermeshing roller 104) for creating strainable networks with complex patterns (e.g., macro and micro patterns). As shown in FIG. 12, the first SELF'ing intermeshing roller 102 may include a plurality of ridges 106 and grooves 108 extending generally radially outward in a direction orthogonal to an axis of rotation 110. As a result, the first SELF'ing intermeshing roller 102 can be similar to a TD intermeshing roller. The second SELF'ing intermeshing roller 104 can also include a plurality of ridges 112 and grooves 114 extending generally radially outward in a direction orthogonal to an axis of rotation 115. As shown in FIG. 12, in some embodiments, the ridges 116 of the second SELF'ing intermeshing roller 104 may include a plurality of notches 117 that define a plurality of spaced teeth 116.

Figure 13:
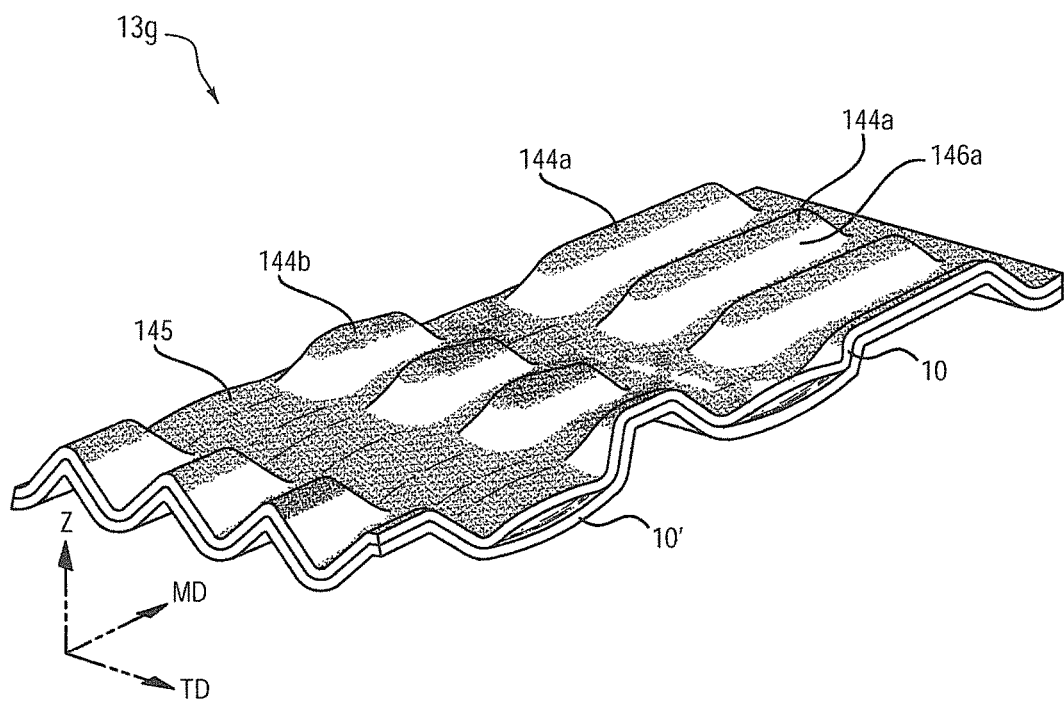
FIG. 13 illustrates a side view of a non-continuously laminated structure of thermoplastic films with differing material compositions and functional material properties created by passing thermoplastic films through the intermeshing rollers of FIG. 12.

As shown by FIG. 12, passing film 10, 10', through the SELF'ing intermeshing rollers 102, 104 can produce a non-continuously laminated structure of thermoplastic films 13g with one or more strainable networks formed by a structural elastic like process in which the strainable networks have a complex pattern (e.g., micro and macro patterns) in the form of a checkerboard pattern. FIG. 13 shows a portion of the non-continuously laminated structure of thermoplastic films 13g. Referring to FIGS. 12 and 13 together, as the films 10, 10' pass through the SELF'ing intermeshing rollers 102, 104, the teeth 116 can press a portion of the films 10,10' out of plane defined by the film to cause permanent deformation of a portion of the film in the Z-direction. For example, the teeth 116 can intermittently stretch a portion of the films 10,10' in the Z-direction. The portions of the films 10,10' that pass between the notched regions 217 of the teeth 216 will remain substantially unformed in the Z-direction. As a result of the foregoing, the non-continuously laminated structure of thermoplastic films 13g includes a plurality of isolated deformed, raised, rib-like elements 144a, 144b and at least one undeformed portion (or web area) 145 (e.g., a relatively flat region). As will be understood by one of ordinary skill in the art, the length and width of the rib-like elements 144a, 144b depend on the length and width of teeth 116 and the speed and the depth of engagement of the intermeshing rollers 102, 104. The rib-like elements 144a, 144b and the un-deformed web areas 145 form a strainable network.

As shown in FIG. 13, the non-continuously laminated structure of thermoplastic films 13g can include first thicker regions 145, second thicker regions 144a, 144b, and stretched, thinner transitional regions 146a connecting the first and second thicker regions 145, 144a, 144b. The first thicker regions 144a, 144b and the stretched, thinner regions 146a can form the raised rib-like elements of the strainable network. In one or more embodiments, the first thicker regions 144a, 144b are the portions of the film with the greatest displacement in the Z-direction.

As shown by FIG. 13, the rib-like elements can have a major axis and a minor axis (i.e., the rib-like elements are elongated such that they are longer than they are wide). As shown by FIGS. 12 and 13, in one or more embodiments, the major axes of the rib-like elements are parallel to the machine direction (i.e., the direction in which the film was extruded). In alternative embodiments, the major axes of the rib-like elements are parallel to the transverse direction. In still further embodiments, the major axes of the rib-like elements are oriented at an angle between 1 and 89 degrees relative to the machine direction. For example, in one or more embodiments, the major axes of the rib-like elements are at a 45-degree angle to the machine direction. In one or more embodiments, the major axes are linear (i.e., in a straight line) in alternative embodiments the major axes are curved or have otherwise non-linear shapes.

As mentioned above, the rib-like elements 144a, 144b and the web areas 145 can be sized and positioned so as to create a complex stretch pattern. As shown by FIG. 12, groups of rib-like elements 144a, 144b can be arranged in different arrangements to form a complex stretching pattern. For example, a first plurality of raised rib-like elements 144a can be arranged in a first pattern 150 and a second plurality of raised rib-like elements 144b arranged in a second pattern 152. The first and the second patterns 150, 152 of raised rib-like elements 144a, 144b can repeat across the non-continuously laminated structure of thermoplastic films 13g. As shown by FIG. 12, first and second patterns 150, 152 of raised rib-like elements 144a, 144b can form a checkerboard pattern. In one or more implementations, the first pattern 150 is visually distinct from the second pattern 152. As used herein, the term "visually distinct" refers to features of a film which are readily discernible to the normal naked eye when the web material or objects embodying the web material are subjected to normal use.

In one or more embodiments, the first pattern 150 of raised rib-like elements 144a comprises a macro pattern while the second pattern 152 of raised rib-like elements 144b comprises a macro pattern. As used herein a macro pattern is a pattern that is larger in one or more ways than a micro pattern. For example, as shown by FIG. 12, the macro pattern 150 has larger/longer raised rib-like elements 144a than the raised rib-like elements 144b of the micro pattern 152. In alternative embodiments, the surface area of a given macro pattern 150 covers more surface area than a surface area covered by a given micro pattern 152. In still further embodiments, a macro pattern 150 can include larger/wider web portions between adjacent raised rib-like elements than web portions between adjacent raised rib-like elements of a micro pattern 152.

As mentioned above, the raised rib-like elements 144a are longer than the raised rib-like elements 144b. In one or more embodiments, the raised rib-like elements 144a have a length at least 1.5 times the length of the raised rib-like elements 144b. For example, the raised rib-like elements 144a can have a length between 1.5 and 20 times the length of the raised rib-like elements 144b. In particular, the raised rib-like elements 144a can have a length 2, 3, 4, 5, 6, 8, or 10 times the length of the raised rib-like elements 144b.

Figure 14:
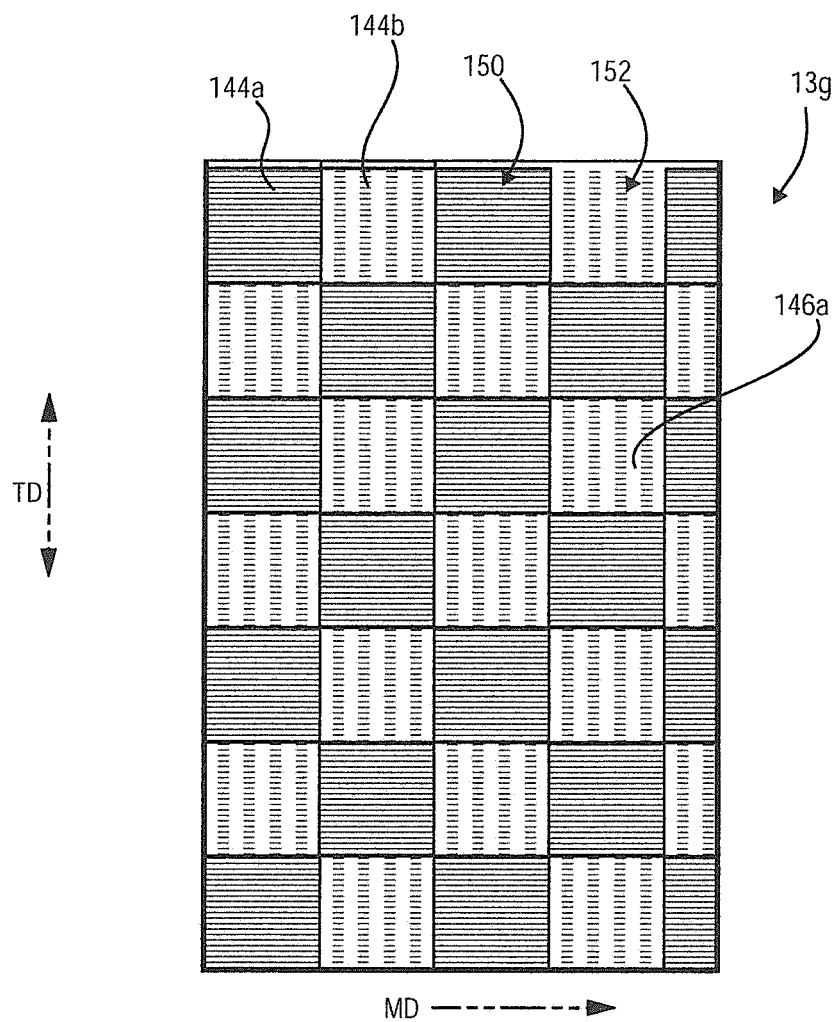
FIG. 14 illustrates a top view of a non-continuously laminated structure of thermoplastic films with differing material compositions and functional material properties created by passing thermoplastic films through the intermeshing rollers of FIG. 12.

FIG. 14 is a top view of a portion of the non-continuously laminated structure of thermoplastic films 13g. As shown, the raised rib-like elements 144a, 144b form macro and micro patterns 150, 152 form a checkerboard pattern. The rib-like elements 144a, 144b are separated by un-bonded portions 146a.

Figure 15:
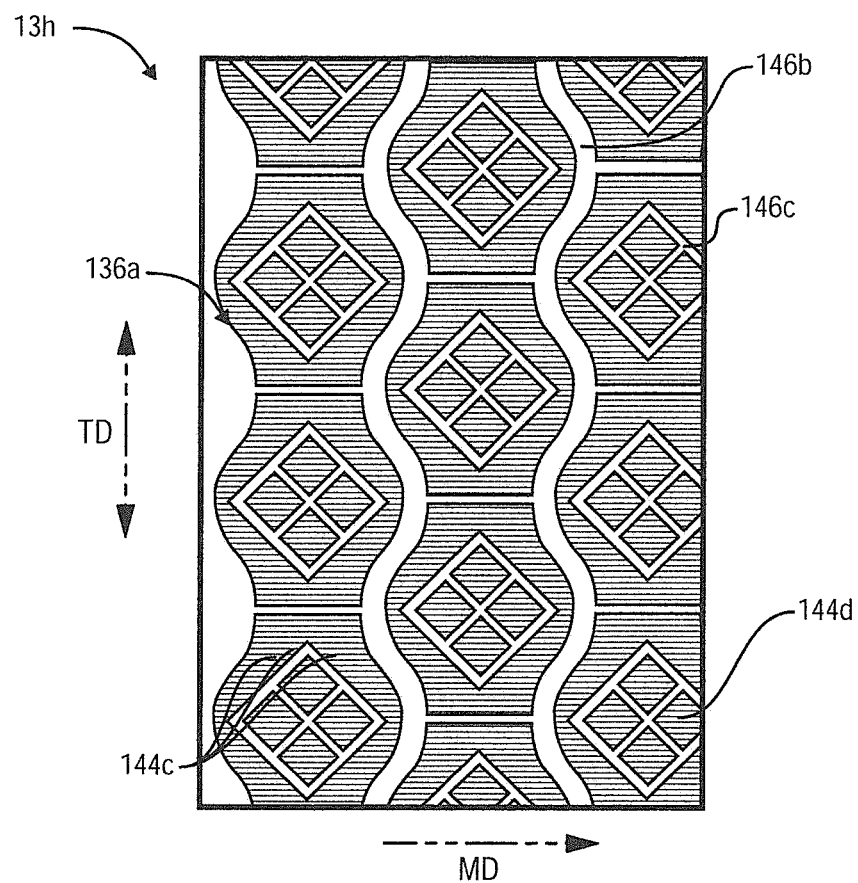
FIG. 15 illustrates a top view of another non-continuously laminated structure of thermoplastic films with differing material compositions and functional material properties with micro and macro stretch patterns formed by SELFing in accordance with one or more implementations of the present invention.

FIG. 15 illustrates another non-continuously laminated structure of thermoplastic films 13h with a complex bonding pattern. FIG. 15 shows that the non-continuously laminated structure of thermoplastic films 13h includes a first plurality of raised rib-like elements 144c in a macro pattern (e.g., a bulbous pattern) and a second plurality of raised rib-like elements 144d in a micro pattern (e.g., four diamonds). As shown, the second plurality of raised rib-like elements 144d in the micro pattern are nested within the macro patterns. Furthermore, the non-continuously laminated structure of thermoplastic films 13h includes web areas (e.g., un-bonded areas) 146b, 146c. The web areas 146b, 146c can surround the micro and the macro patterns of raised rib-like elements. Furthermore, the web areas 146b are arranged in a sinusoidal pattern.

Figure 16:
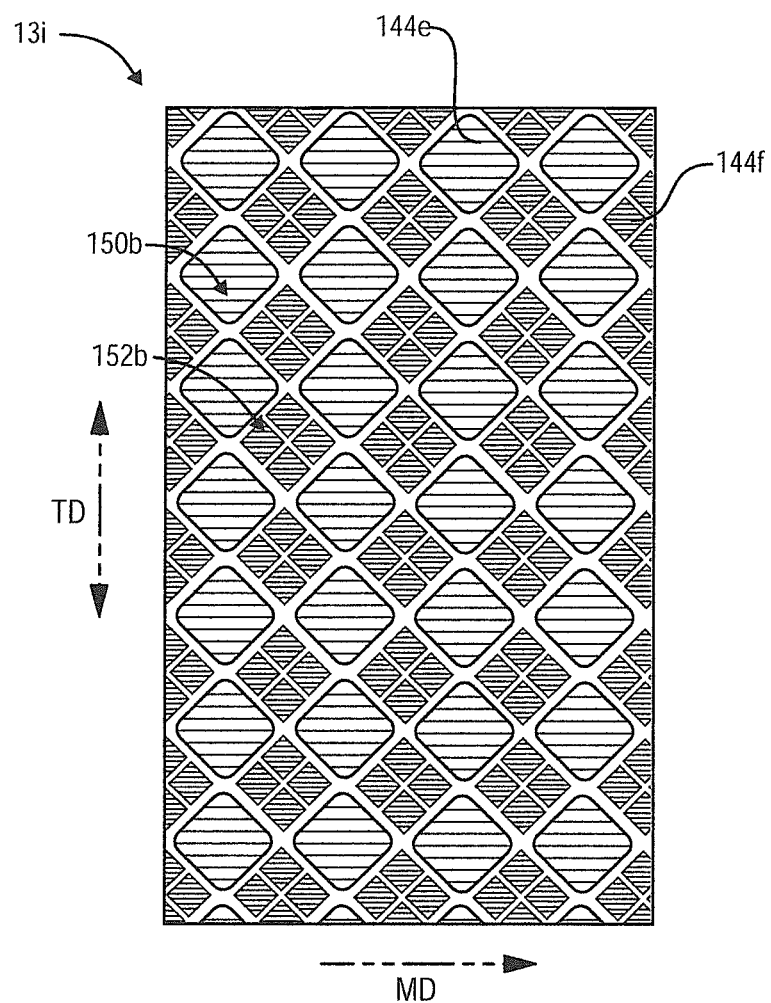
FIG. 16 illustrates a top view of yet another non-continuously laminated structure of thermoplastic films with differing material compositions and functional material properties with micro and macro stretch patterns formed by SELFing in accordance with one or more implementations of the present invention.

FIG. 16 illustrates another non-continuously laminated structure of thermoplastic films 13i with a complex bonding pattern. FIG. 16 shows that the non-continuously laminated structure of thermoplastic films 13i includes a first plurality of raised rib-like elements 144e in a macro pattern 150b (e.g., a fenced diamonds) and a second plurality of raised rib-like elements 144f in a micro pattern 145b (e.g., four diamonds). The fenced diamond pattern can comprise raised-rib-like elements 144e arranged in diamond patterns where the intersections of the sides of the diamond are rounded rather than ending in corners. As shown, the second plurality of raised rib-like elements 144f in the micro pattern 152b are nested within the macro patterns 150b.

One will appreciate in light of the disclosure herein that the non-continuously laminated structure of thermoplastic films with differing material compositions and functional material properties 13-13i can form part of any type of product made from, or incorporating, thermoplastic films. For instance, grocery bags, trash bags, sacks, packaging materials, feminine hygiene products, baby diapers, adult incontinence products, sanitary napkins, bandages, food storage bags, food storage containers, thermal heat wraps, facial masks, wipes, hard surface cleaners, and many other products can include the non-continuously laminated structure of thermoplastic films with differing material compositions and functional material properties to one extent or another. Trash bags and food storage bags may be particularly benefited by the films and methods of one or more implementations of the present invention.

Figure 17:
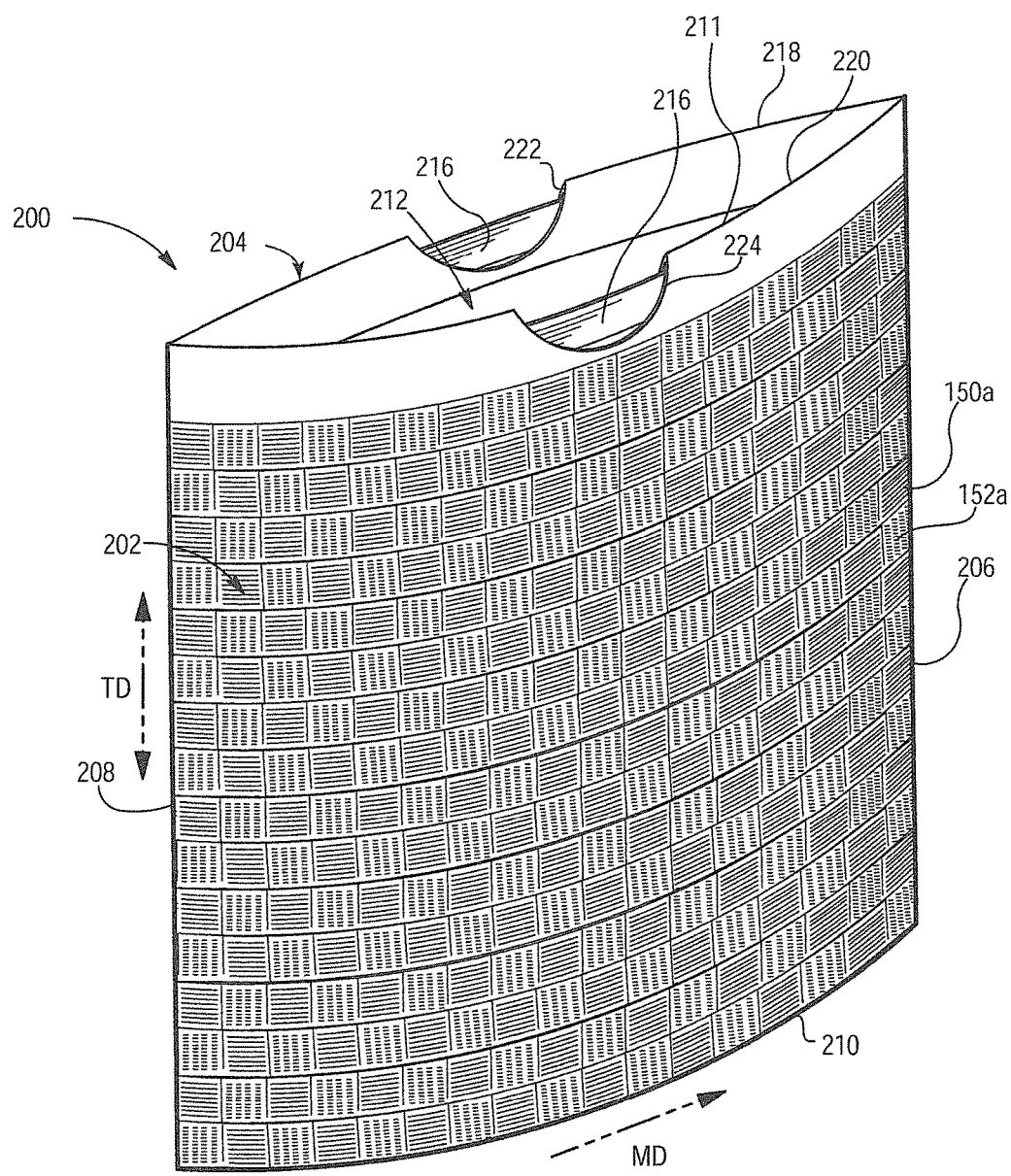
FIG. 17 illustrates a bag incorporating the non-continuously laminated structure of thermoplastic films with differing material compositions and functional material properties of FIG. 14 in accordance with one or more implementations of the present invention.

Referring to FIG. 17, in a particular implementation, the non-continuously laminated structure of thermoplastic films with differing material compositions and functional material properties 13g illustrated in FIG. 14 may be incorporated in a bag construction, such as a flexible draw tape bag. The non-continuously laminated bag of thermoplastic films with differing material compositions and functional material properties 200 includes a first sidewall 202 and a second sidewall 204. Each of the first and second sidewalls 202, 204 includes a first side edge 206, a second opposite side edge 208, a bottom edge extending between the first and second side edges 206, 208. The first and second sidewalls 202, 204 also include a top edge 211 extending between the first and second side edges 206, 208 opposite the bottom edge. In some implementations, the first sidewall 202 and the second sidewall 204 are joined together along the first side edges 206, the second opposite side edges 208, and the bottom edges 210. The first and second sidewalls 202, 204 may be joined along the first and second side edges 206, 208 and bottom edges 210 by any suitable process such as, for example, a heat seal. In alternative implementations, the first and second sidewalls 202, 204 may not be joined along the side edges. Rather, the first and second sidewalls 202, 204 may be a single uniform piece. In other words, the first and second sidewalls 202, 204 may form a sleeve or a balloon structure. In particular, non-continuously laminated bag of thermoplastic films with differing material compositions and functional material properties 200 can include a bag body formed from a piece of non-continuously laminated structure of thermoplastic films with differing material compositions and functional material properties 13-13i folded upon itself along a bag bottom 210.

In some implementations, the bottom edge 210 or one or more of the side edges 206, 208 can comprise a fold. In other words, the first and second sidewalls 202, 204 may comprise a single unitary piece of material. The top edges 211 of the first and second sidewalls 202, 204 may define an opening 212 to an interior of the thermoplastic bag 200 with a complex stretch pattern. In other words, the opening 22 may be oriented opposite the bottom edge 210 of the thermoplastic bag 200 with a complex stretch pattern. Furthermore, when placed in a trash receptacle, the top edges 211 of the first and second sidewalls 202, 204 may be folded over the rim of the receptacle.

Furthermore, a bag 200 formed from a non-continuously laminated structure of thermoplastic films with differing material compositions and functional material properties 13-13i can have a first film or first layer of a first thermoplastic material. The first layer can include first and second side walls joined along a bottom edge, a first side edge, and an opposing second side edge. In particular, the bottom edge of the first layer can comprise a fold. The bag 200 can also include a second film or second layer of a second thermoplastic material. The second layer can include including first and second side walls joined along a bottom edge, a first side edge, and an opposing second side edge. The second layer can be positioned within the first layer or vice versa. Furthermore, the first and the second layer are lightly bonded to each other and incrementally stretched.

As shown, the sides of the bag body can include two film layers with thicker regions that are bonded and stretched regions that are un-bonded forming a macro pattern 150a and a micro pattern 152a. The non-continuously laminated bag of thermoplastic films with differing material compositions and functional material properties 200 can require less material to form than an identical bag formed with film of the same thermoplastic material. Additionally, despite requiring less material, the non-continuously laminated bag of thermoplastic films 200 includes improved strength properties imparted by lightly bonding adjacent layers together. Furthermore, the bag 200 includes the functional benefits of the individual layers or films.

In some implementations, the non-continuously laminated bag of thermoplastic films with differing material compositions and functional material properties 200 may optionally include a closure mechanism located adjacent to the top edges 211 for sealing the top of the non-continuously laminated bag of thermoplastic films to form an at least substantially fully-enclosed container or vessel. As shown in FIG. 17, in some implementations, the closure mechanism comprises a draw tape 216, a first hem 218, and a second hem 220. In particular, the first top edge 211 of the first sidewall 202 may be folded back into the interior volume and may be attached to an interior surface of the first sidewall 202 to form the first hem 218. Similarly, the second top edge 211 of the second sidewall 204 is folded back into the interior volume and may be attached to an interior surface of the second sidewall 204 to form a second hem 220. The draw tape 216 extends through the first and second hems 218, 220 along the first and second top edges 211. The first hem 218 includes a first aperture 222 (e.g., notch) extending through the first hem 218 and exposing a portion of the draw tape 216. Similarly, the second hem 220 includes a second aperture 224 extending through the second hem 220 and exposing another portion of the draw tape 216. During use, pulling the draw tape 216 through the first and second apertures 222, 224 will cause the first and second top edge 210 to constrict. As a result, pulling the draw tape 216 through the first and second apertures 222, 224 will cause the opening 212 of the non-continuously laminated bag of thermoplastic films to at least partially close or reduce in size. The draw tape closure mechanism may be used with any of the implementations of a non-continuously laminated bag of thermoplastic films described herein.

Although the non-continuously laminated bag of thermoplastic films 200 is described herein as including a draw tape closure mechanism, one of ordinary skill in the art will readily recognize that other closure mechanisms may be implemented into the non-continuously laminated bag of thermoplastic films 200. For example, in some implementations, the closure mechanism may include one or more of flaps, adhesive tapes, a tuck and fold closure, an interlocking closure (e.g., zipper closure), a slider closure, or any other closure structures known to those skilled in the art for closing a bag.

Figure 18:
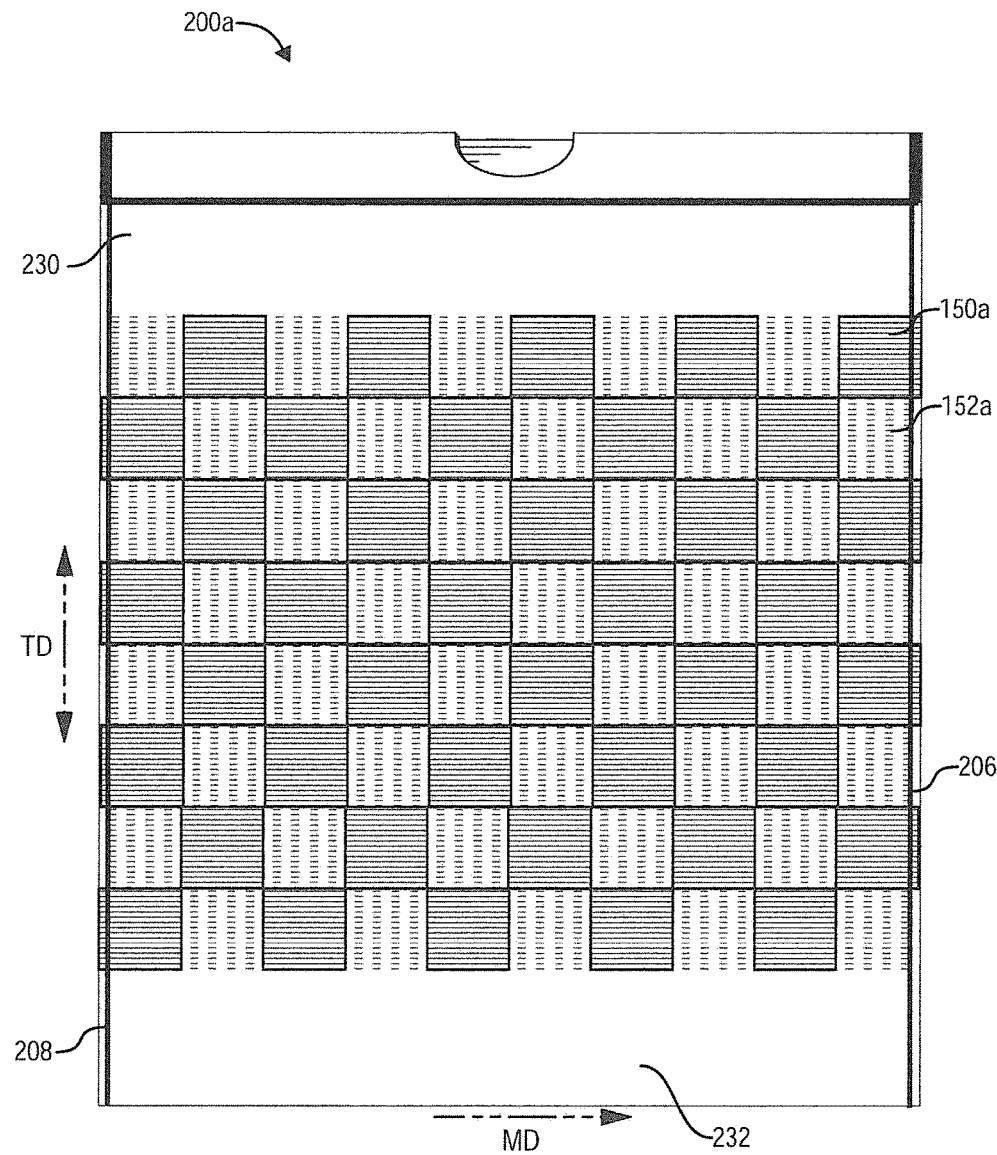
FIG. 18 illustrates another bag incorporating the non-continuously laminated structure of thermoplastic films with differing material compositions and functional material properties of FIG. 14 in accordance with one or more implementations of the present invention.

While the non-continuously laminated bag of thermoplastic films with differing material compositions and functional material properties 200 of FIG. 17 shows that the entire side walls are incrementally stretched and non-continuously bonded, other implementations comprise portions of sidewalls without bonding or incremental stretching. For example, FIG. 18 illustrates a non-continuously laminated bag of thermoplastic films with differing material compositions and functional material properties 200a in which an upper portion 203 and a lower portion 232 are not incrementally stretched or non-continuously bonded. Thus, the upper region 230 and the lower region 232 can have an average gauge or thickness greater than the average gauge or thickness of the middle section including the macro and micro bonding patterns 150a, 152a. In one or more embodiments, each of the bottom section 232 and the top section 230 is between $\frac{1}{16}^{th}$ an inch and 8 inches in length and extends in width from side seal to side seal. In other embodiments, the each of the bottom section 232 and the top section 230 is between 1 an inch and 4 inches. In one or more embodiments, the lengths of the bottom section 232 and the top section 230 are equal. In alternative embodiments, the bottom section 232 and the top section 230 have unequal or differing lengths.

Figure 19:
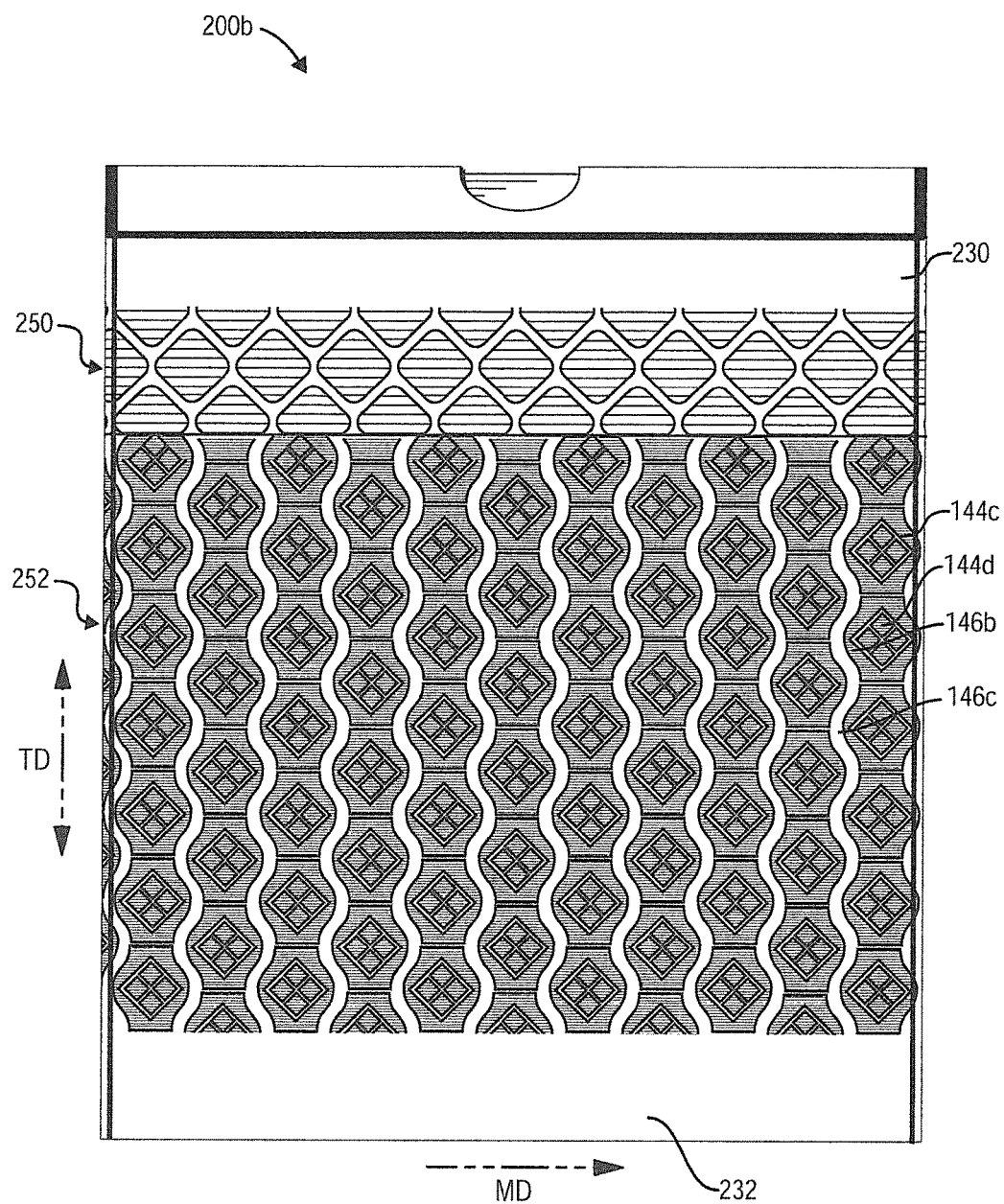
FIG. 19 illustrates a bag incorporating another non-continuously laminated structure of thermoplastic films with differing material compositions and functional material properties with multiple different bonding patterns in accordance with one or more implementations of the present invention.

While FIGS. 17 and 18 illustrate non-continuously laminated bags of thermoplastic films with a single bonding pattern, other implementations can comprise multiple different bonding patterns. In particular, a manufacturer can tailor different areas of a bag with different properties by providing the different areas of the bag with different bonding patterns between the films. For example, FIG. 19 shows another non-continuously laminated bag of thermoplastic films with differing material compositions and functional material properties 200b with a first bonding pattern (a fenced diamond pattern) in a first area 250 and a second bonding pattern (e.g., a bulbous pattern with nested diamonds) in a second area 252. Furthermore, the non-continuously laminated bag of thermoplastic films 200b also includes a bottom section 232 and a top section 230 devoid of bonding.

As shown by FIG. 19, the sidewalls include a first plurality of raised rib-like elements 144c in a macro pattern (e.g., a bulbous pattern) and a second plurality of raised rib-like elements 144d in a micro pattern (e.g., four diamonds). As shown, the second plurality of raised rib-like elements 144d in the micro pattern are nested within the macro patterns. Furthermore, the non-continuously laminated bag of thermoplastic films 200b includes web areas 146b, 1146c.

The fenced diamond pattern can comprise raised-rib-like elements arranged in diamond patterns where the intersections of the sides of the diamond are rounded rather than ending in corners. The fenced diamond pattern can also comprise web areas comprise areas in which the first layer and the second layer are separated as described above.

Figure 20:
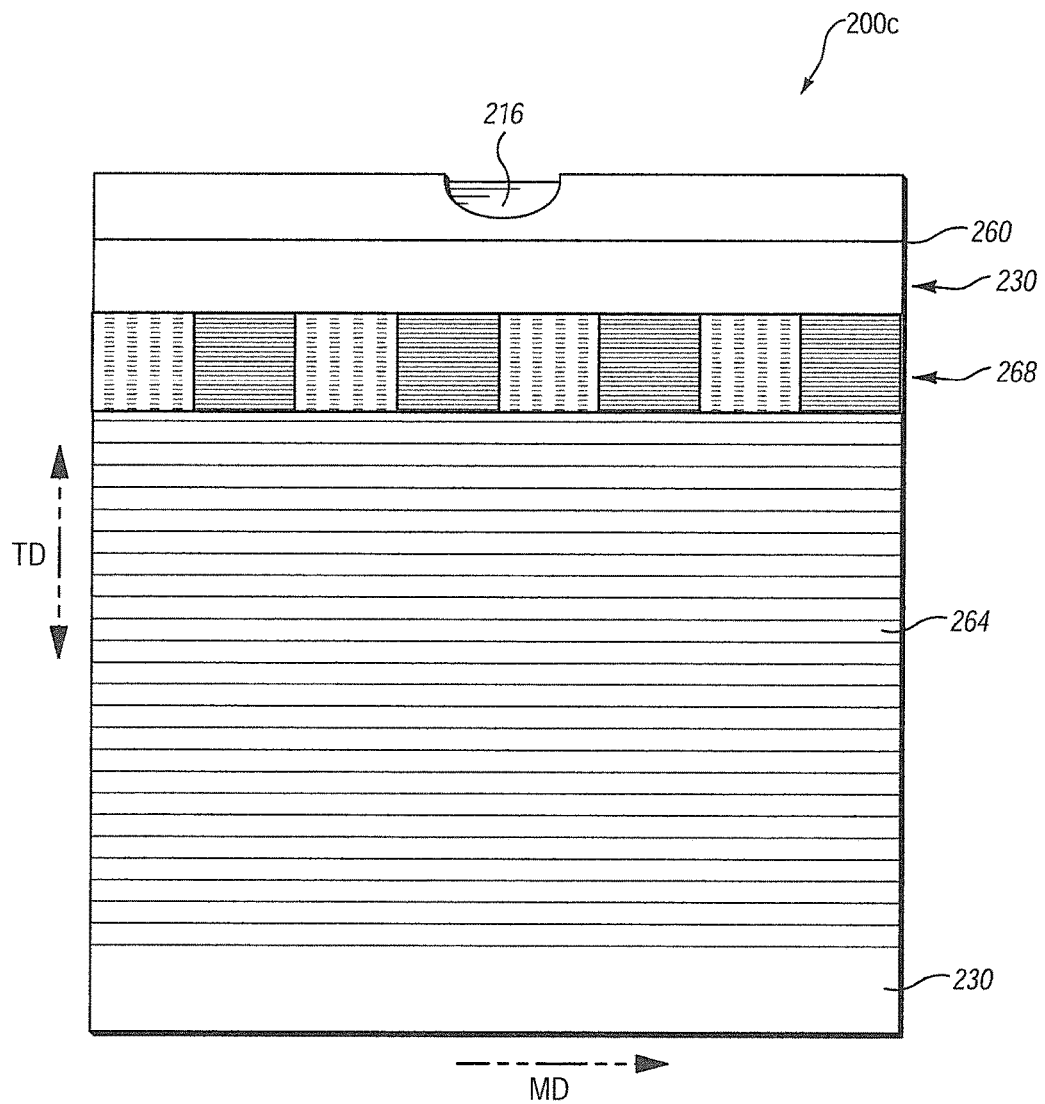
FIG. 20 illustrates another bag incorporating another non-continuously laminated structure of thermoplastic films with differing material compositions and functional material properties with multiple different bonding patterns in accordance with one or more implementations of the present invention.

While the bags 200-200b described above include bonding patterns of a single type (SELFing bonds), bags and non-continuously laminated structure of thermoplastic films with differing material compositions and functional material properties can comprise multiple different types of bonding. For example, FIG. 20 illustrates another non-continuously laminated bag of thermoplastic films with differing material compositions and functional material properties 200c with one section 268 comprising bonds formed by SELFing (e.g., the checkerboard pattern described above in relation to FIGS. 12-14), while another section 264 includes a TD ring rolling pattern.

Figure 21:
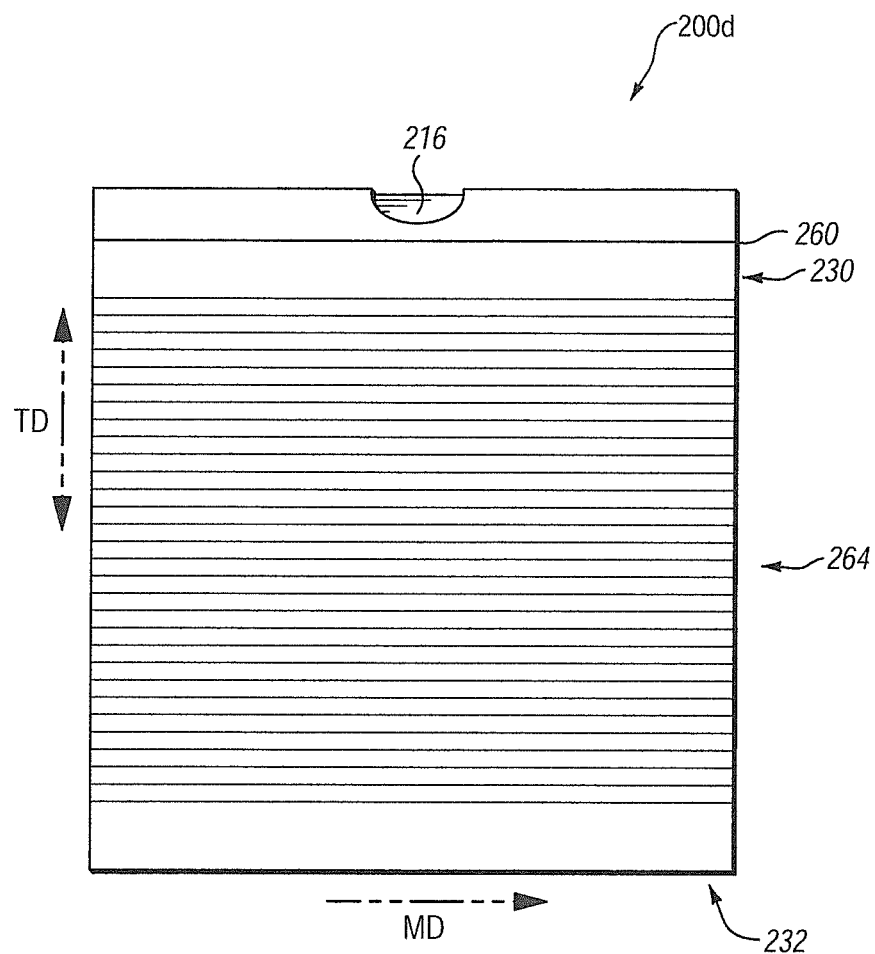
FIG. 21 a bag incorporating the non-continuously laminated structure of thermoplastic films with differing material compositions and functional material properties of FIG. 6 in accordance with one or more implementations of the present invention.

While the bags 200-200b described above include bonding patterns of SELFing bonds, bags and non-continuously laminated structure of thermoplastic films with differing material compositions and functional material properties can comprise or consist of other types of bonding. For example, FIG. 21 illustrates another non-continuously laminated bag of thermoplastic films with differing material compositions and functional material properties 200d with a section 264 that includes a TD ring rolling bonding pattern.

In one or more embodiments, the thermoplastic films of the non-continuously laminated structure of thermoplastic films are selected based on a product incorporating the non-continuously laminated structure of thermoplastic films. For example, in the case a bag, the inner film may have enhanced toughness properties (tear and impact resistance) to maintain the bag contents and the outer film can be scuff resistant so the bag can be dragged across a floor without failing. Alternatively, the inner film of a bag includes increased impact resistance (dart drop) to help resist damage with objects are placed into the bag, and an outer layer can include enhanced tear resistance to prevent the bag from tearing. In yet another embodiment, the inner layer can be made with a material that provides a high tensile force (which typically has very low impact resistance), and an outer layer having high impact resistance (which typically has low tensile strength).

Figure 22:
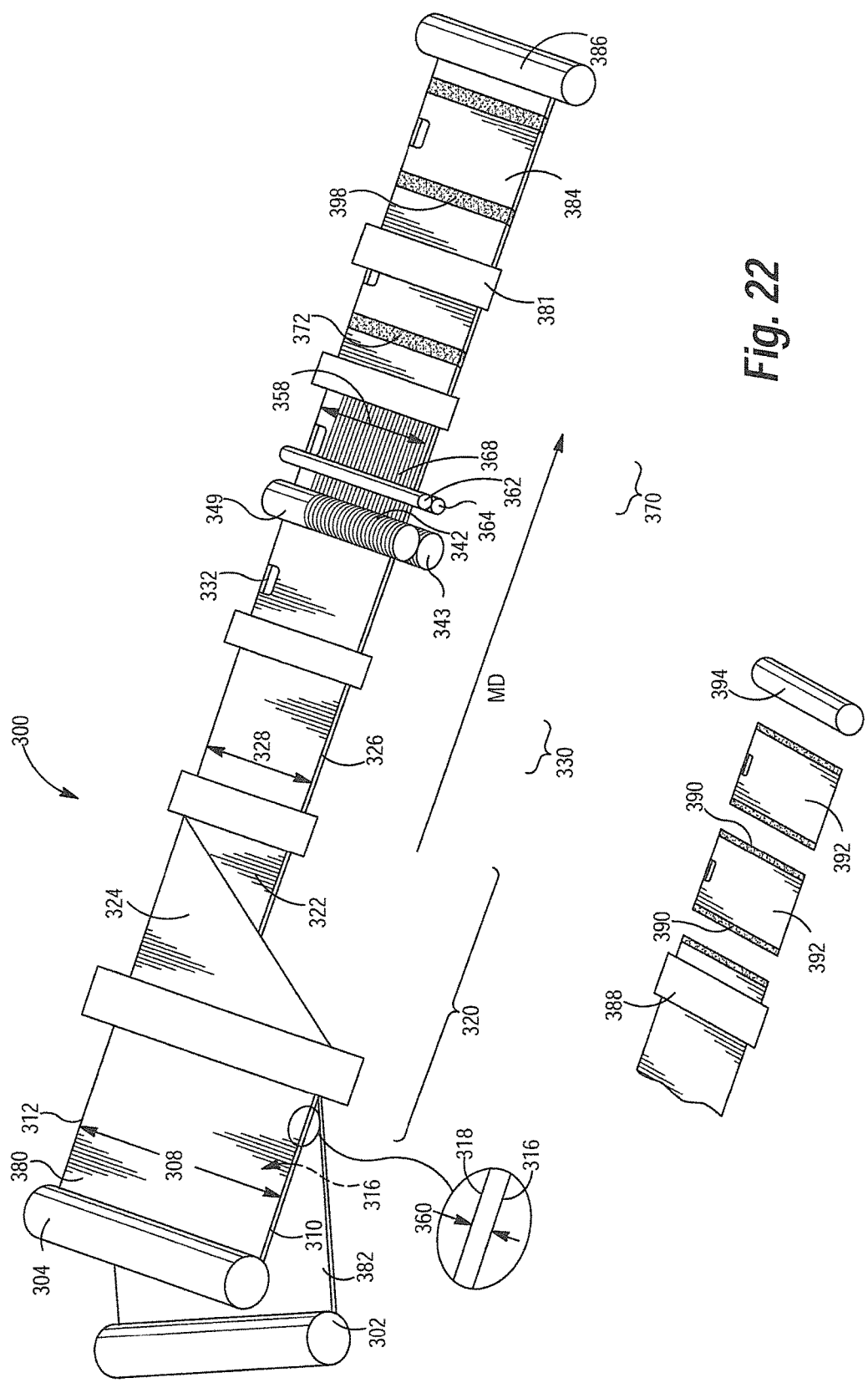
FIG. 22 illustrates a schematic diagram of a bag manufacturing process in accordance with one or more implementations of the present invention.

One or more implementations of the present invention can also include methods of forming non-continuously laminated bags of thermoplastic films with differing material compositions and functional material properties. FIG. 22 and the accompanying description describe such methods. Of course, as a preliminary matter, one of ordinary skill in the art will recognize that the methods explained in detail herein can be modified. For example, various acts of the method described can be omitted or expanded, additional acts can be included, and the order of the various acts of the method described can be altered as desired.

In particular, to produce a non-continuously laminated bag of thermoplastic films with differing material compositions and functional material properties, continuous webs of thermoplastic material may be processed through a high-speed manufacturing environment such as that illustrated in FIG. 22. In the illustrated process 300, production may begin by unwinding a first continuous web or film 380 of a first thermoplastic material from a roll 304 and advancing the web along a machine direction 306. The unwound web 380 may have a width 308 that may be perpendicular to the machine direction 306, as measured between a first edge 310 and an opposite second edge 312. The unwound web 380 may have an initial average thickness 360 measured between a first surface 316 and a second surface 318. In other manufacturing environments, the web 380 may be provided in other forms or even extruded directly from a thermoplastic forming process.

The process 300 further involves unwinding a second continuous web or film 382 of a second thermoplastic material from a roll 302 and advancing the web along a machine direction 306. The second film 382 can comprise a second thermoplastic material that differs from the first material. Additionally, the second film 382 can comprise, a width, and/or a thickness that is similar or the same as the first film 380. In alternative one or more implementations, one or more of the width, and/or thickness of the second film 382 can differ from that of the first film 380.

To provide the first and second sidewalls of the finished bag, the films 380, 382 may be folded into a first half 322 and an opposing second half 324 about the machine direction 306 by a folding operation 320. When so folded, the first edge 310 may be moved adjacent to the second edge 312 of the films 380, 382. Accordingly, the width of the films 380, 382 proceeding in the machine direction 306 after the folding operation 320 may be a width 328 that may be half the initial width 308. As may be appreciated, the portion mid-width of the unwound films 380, 382 may become the outer edge of the folded web. In any event, the hems may be formed along the adjacent first and second edges 310, 312 and a draw tape 332 may be inserted during a hem and draw tape operation 330.

To bond (and optionally stretch) the films 380, 382, the processing equipment may include intermeshing rollers 342, 343 such as those described herein above. The folded films 380, 382 may be advanced along the machine direction 306 between the intermeshing rollers 342, 343, which may be set into rotation in opposite rotational directions to impart the resulting bonding pattern 368. To facilitate patterning of the films 380, 382, the first roller 342 and second roller 343 may be forced or directed against each other by, for example, hydraulic actuators. The pressure at which the rollers are pressed together may be in a first range from 30 PSI (2.04 atm) to 100 PSI (6.8 atm), a second range from 60 PSI (4.08 atm) to 90 PSI (6.12 atm), and a third range from 75 PSI (5.10 atm) to 85 PSI (5.78 atm). In one or more implementations, the pressure may be about 80 PSI (5.44 atm).

In the illustrated implementation, the bonding pattern 368 intermeshing rollers 342, 343 may be arranged so that they are co-extensive with or wider than the width 308 of the folded films 380, 382. In one or more implementations, the bonding pattern 368 created by intermeshing rollers 342, 343 may extend from proximate the folded edge 326 to the adjacent edges 310, 312. To avoid imparting the bonding pattern 368 onto the portion of the films 380, 382 that includes the draw tape 332, the corresponding ends 349 of the rollers 342, 343 may be smooth and without the ridges and grooves. Thus, the adjacent edges 310, 312 and the corresponding portion of the films 380, 382 proximate those edges that pass between the smooth ends 349 of the rollers 342, 343 may not be imparted with the bonding pattern 368.

The processing equipment may include pinch rollers 362, 364 to accommodate the width 358 of the films 380, 382. To produce the finished bag, the processing equipment may further process the folded films 380, 382. For example, to form the parallel side edges of the finished bag, the films 380, 382 may proceed through a sealing operation 370 in which heat seals 372 may be formed between the folded edge 326 and the adjacent edges 310, 312. The heat seals may fuse together the adjacent halves 322, 324 of the folded films 380, 382. The heat seals 372 may be spaced apart along the folded films 380, 382 and in conjunction with the folded outer edge 326 may define individual bags. The heat seals may be made with a heating device, such as, a heated knife. A perforating operation 381 may perforate 382 the heat seals 372 with a perforating device, such as, a perforating knife so that individual bags 390 may be separated from the films 380, 382. In one or more implementations, the films 380, 382 may be folded one or more times before the folded films 380, 382 may be directed through the perforating operation. The films 380, 382 embodying the bags 384 may be wound into a roll 386 for packaging and distribution. For example, the roll 386 may be placed in a box or a bag for sale to a customer.

In one or more implementations of the process, a cutting operation 388 may replace the perforating operation 380. The web is directed through a cutting operation 388 which cuts the films 380, 382 at location 390 into individual bags 392 prior to winding onto a roll 394 for packaging and distribution. For example, the roll 394 may be placed in a box or bag for sale to a customer. The bags may be interleaved prior to winding into the roll 394. In one or more implementations, the films 380, 382 may be folded one or more times before the folded web is cut into individual bags.

In one or more implementations, the bags 392 may be positioned in a box or bag, and not onto the roll 394.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. Moreover, any combination of the above-described elements in all possible variations thereof is encompassed by the invention unless otherwise indicated herein or otherwise clearly contradicted by context. All changes that come within the meaning and range of equivalency of the claims are to be embraced within their scope.

We claim:

1. A non-continuously laminated structure of thermoplastic films with differing material compositions and functional material properties, comprising:
   a first thermoplastic film comprising a first material composition that provides the first thermoplastic film layer with a first functional material property;
   a second thermoplastic film layer comprising a second material composition that provides the second thermoplastic film layer with a second functional material property; and
   a plurality of non-continuous bonds securing the first thermoplastic film layer directly to the second thermoplastic film layer;
   wherein the non-continuously laminated structure of thermoplastic films with differing material compositions and functional material properties demonstrates both the first functional material property and the second functional material property.

2. The non-continuously laminated structure of thermoplastic films as recited in claim 1, wherein the first functional material property and the second functional material property are opposing functional material properties.

3. The non-continuously laminated structure of thermoplastic films as recited in claim 1, wherein one or more of the first and second first thermoplastic film are incrementally stretched.

4. The non-continuously laminated structure of thermoplastic films as recited in claim 1, wherein:
   the first functional material property comprises one or more of scuff resistance, tear resistance, toughness, stretch-ability, impact resistance, or high tensile strength; and
   the second functional material property comprises another of scuff resistance, tear resistance, toughness, stretch-ability, impact resistance, or high tensile strength.

5. The non-continuously laminated structure of thermoplastic films as recited in claim 1, wherein the first thermoplastic film has a first shrink rate and the second thermoplastic film has a second shrink rate.

6. The non-continuously laminated structure of thermoplastic films as recited in claim 1, wherein:
   the first material composition comprises a first density; and
   the second material composition comprises a second density that differs from the first density.

7. The non-continuously laminated structure of thermoplastic films as recited in claim 1, wherein:
   the first material composition comprises a first molecular weight; and
   the second material composition comprises a second molecular weight that differs from the first molecular weight.

8. The non-continuously laminated structure of thermoplastic films as recited in claim 1, wherein the non-continuously laminated structure of thermoplastic films is formed into a bag.

9. The non-continuously laminated structure of thermoplastic films as recited in claim 1, wherein the first material composition comprises as a principal component linear low-density polyethylene.

10. The non-continuously laminated structure of thermoplastic films as recited in claim 9, wherein the second material composition comprises as a principal component a polymer other than linear low-density polyethylene.

11. The non-continuously laminated structure of thermoplastic films as recited in claim 10, wherein the second material composition comprises as a principal component high-density polyethylene, polypropylene, or polystyrene.

12. The non-continuously laminated structure of thermoplastic films as recited in claim 9, wherein:
   the second material composition comprises as a principal linear low-density polyethylene; and
   the second material composition comprises as a filler that the first material composition lacks.

13. A non-continuously laminated structure of thermoplastic films with differing material compositions and functional material properties, comprising:
   a first thermoplastic film comprising a first material composition that provides the first thermoplastic film layer with a first functional material property, wherein the first material composition comprises a first polymer as a principal component, a first density, and a first molecular weight;
   a second thermoplastic film layer comprising a second material composition that provides the second thermoplastic film layer with a second functional material property, wherein the second material composition comprises one or more of:
      a second polymer as a principal component, where the second polymer differs from the first polymer;
      a second density, where the second density differs from the first density;
      a second molecular weight, where the second molecular weight differs from the first molecular weight; or
      an additive that is lacking in the first material composition; and
   a plurality of non-continuous bonds securing the first thermoplastic film layer directly to the second thermoplastic film layer.

14. The non-continuously laminated structure of thermoplastic films as recited in claim 13, wherein the first functional material property and the second functional material property are opposing functional material properties.

15. The non-continuously laminated structure of thermoplastic films as recited in claim 13, wherein the first material composition comprises as a principal component linear low-density polyethylene.

16. The non-continuously laminated structure of thermoplastic films as recited in claim 13, wherein one or more of the first and second first thermoplastic film are incrementally stretched.

17. The non-continuously laminated structure of thermoplastic films as recited in claim 13, wherein:
   the first functional material property comprises one or more of scuff resistance, toughness, tear resistance, stretch-ability, impact resistance, or high tensile strength; and the second functional material property comprises another of scuff resistance, increased, tear resistance, stretchability, impact resistance, or high tensile strength.

18. The non-continuously laminated structure of thermoplastic films as recited in claim 13, wherein the non-continuously laminated structure of thermoplastic films is formed into a bag.

19. The non-continuously laminated structure of thermoplastic films as recited in claim 18, wherein the first thermoplastic film comprises an outer layer of the bag and the second thermoplastic film comprises an inner layer of the bag.

20. The non-continuously laminated structure of thermoplastic films as recited in claim 18, wherein the first functional material property comprises scuff resistance and the second functional material property comprises increased toughness.

\* \* \* \* \*